Figure 1:
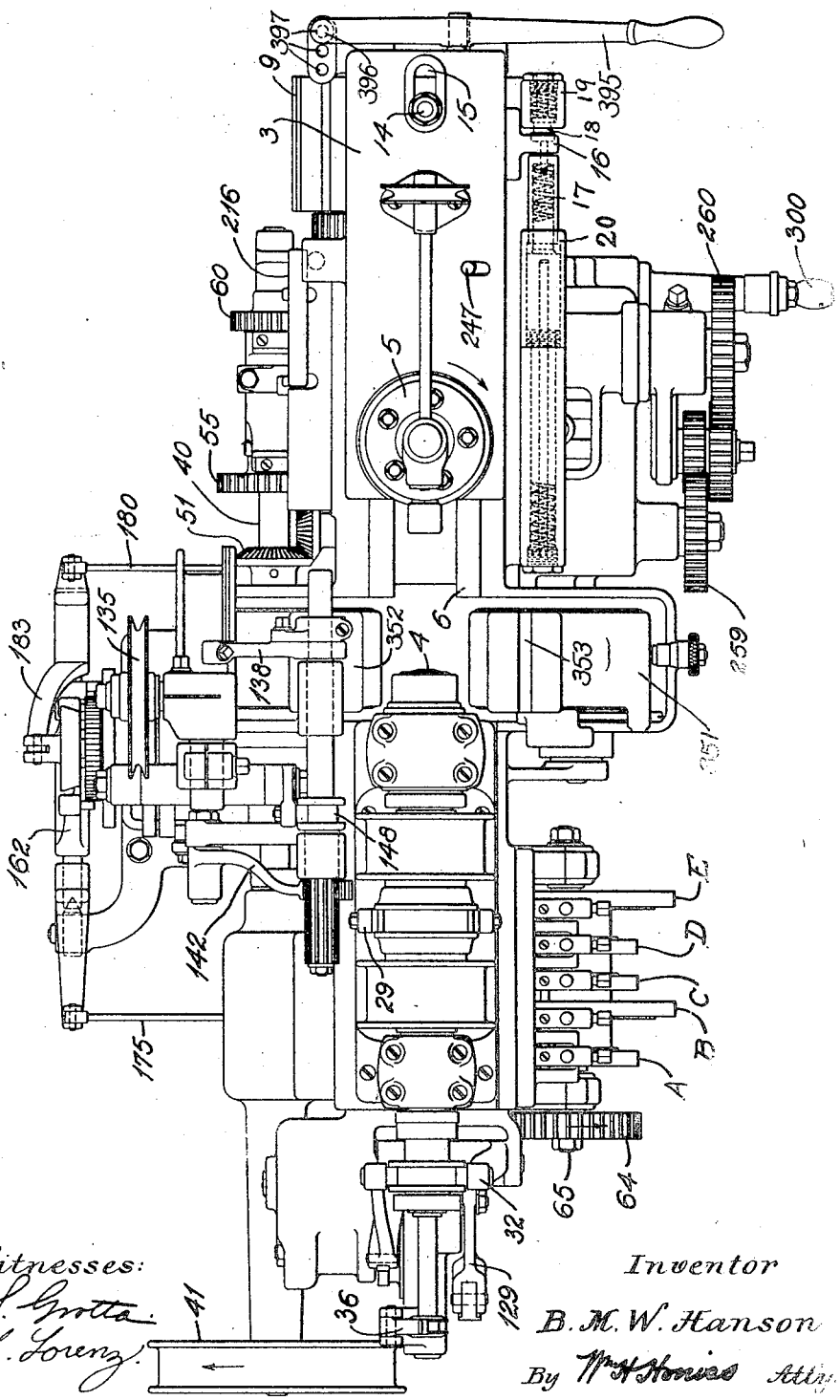

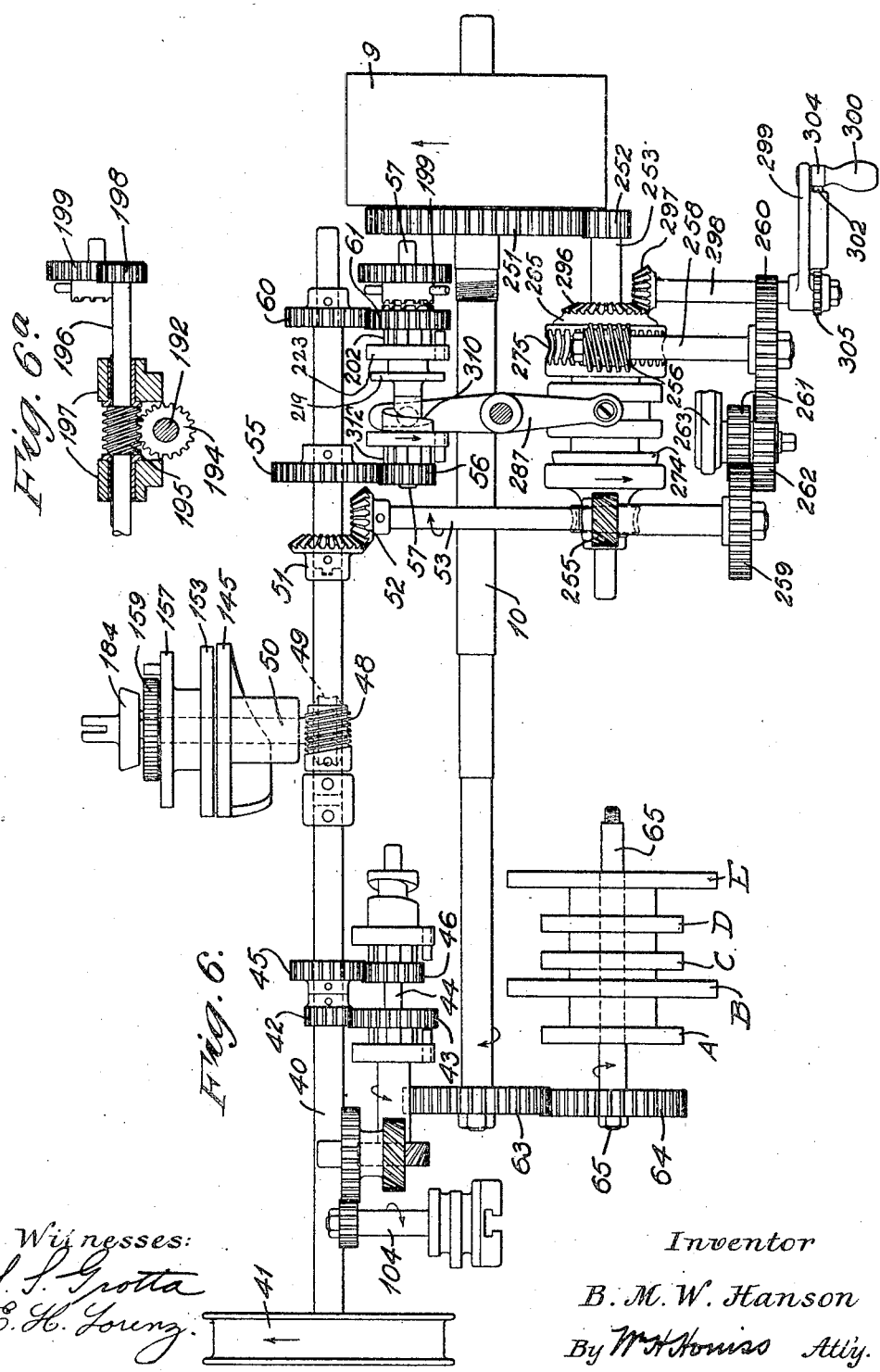

B. M. W. HANSON.
METAL SCREW MACHINE.
APPLICATION FILED APR. 7, 1910.
1,133,642.
Patented Mar. 30, 1915.
15 SHEETS—SHEET 6.
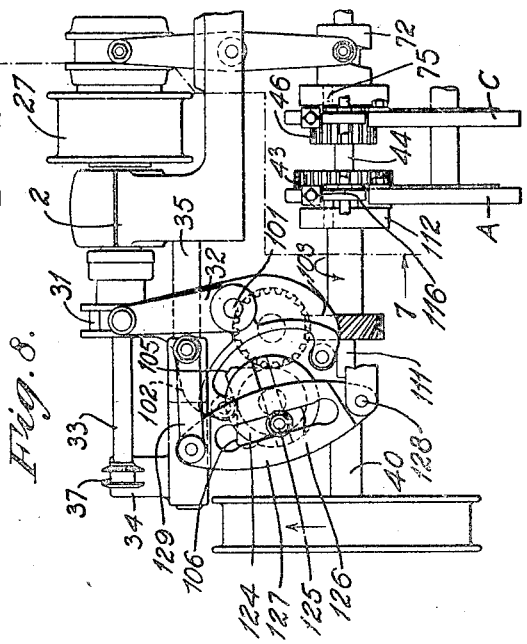
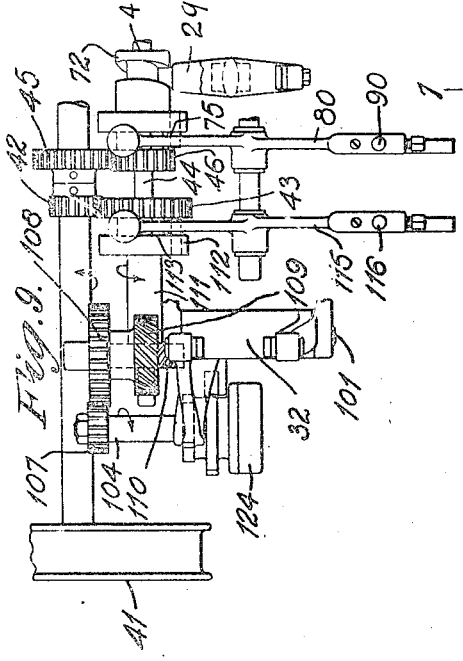
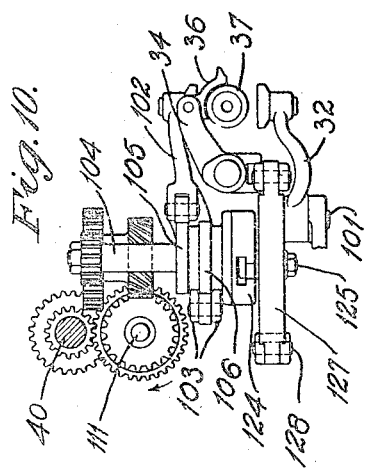
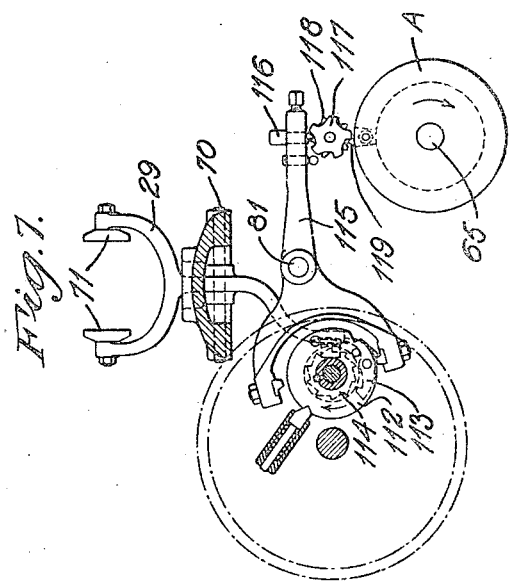
Witnesses:
Inventor
B. M. W. Hanson
By W. H. Honiss Atty.

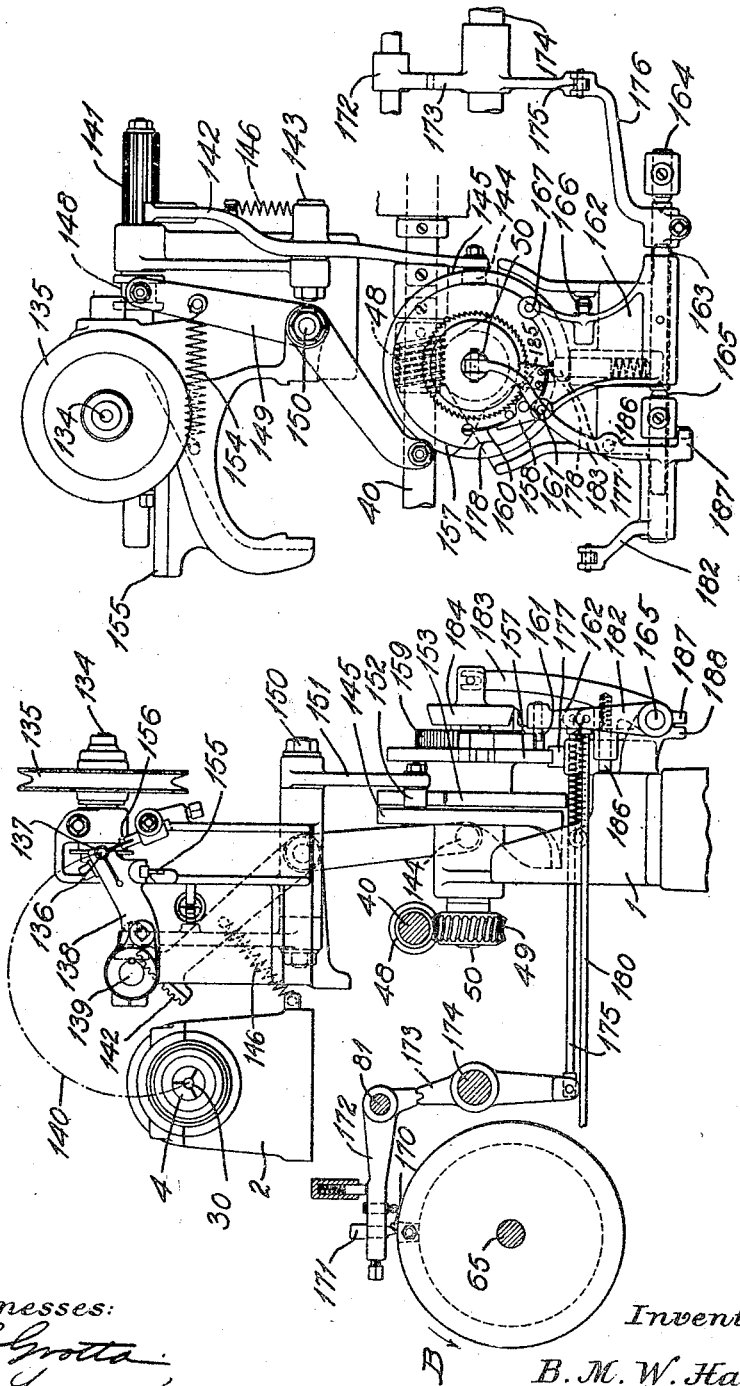

B. M. W. HANSON.
METAL SCREW MACHINE.
APPLICATION FILED APR. 7, 1910.
1,133,642.
Patented Mar. 30, 1915.
15 SHEETS—SHEET 8.
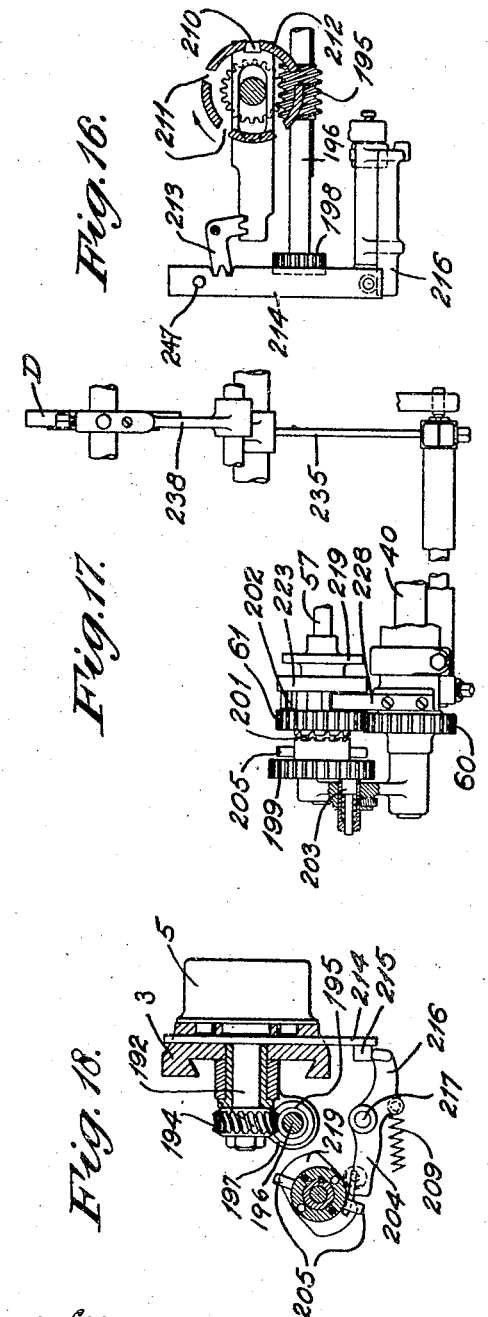
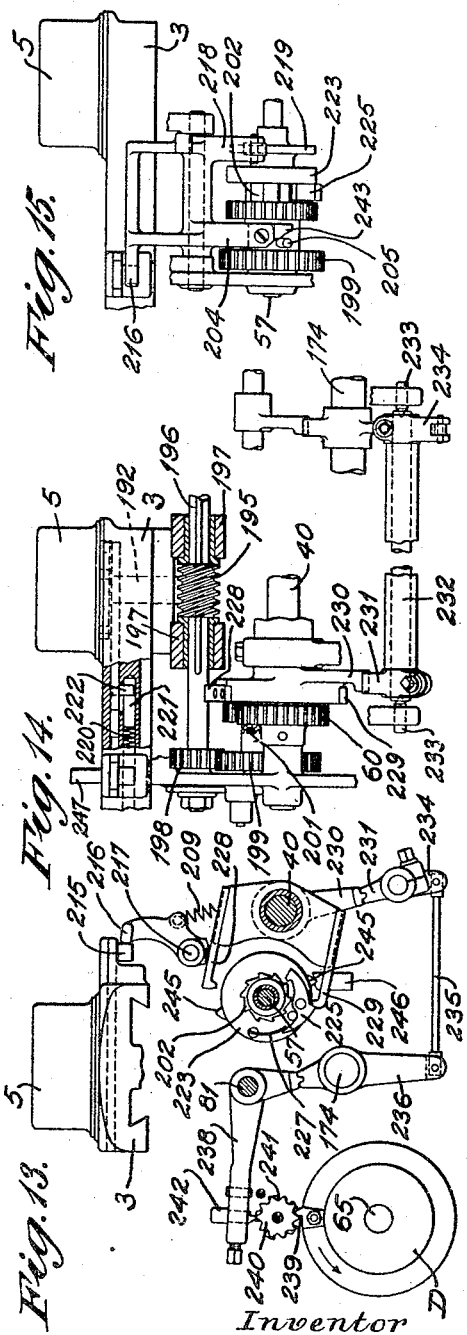
Witnesses:
Inventor
B. M. W. Hanson
By W. H. Honiss Att'y.

B. M. W. HANSON.
METAL SCREW MACHINE.
APPLICATION FILED APR. 7, 1910.
1,133,642.
Patented Mar. 30, 1915.
15 SHEETS—SHEET 9.
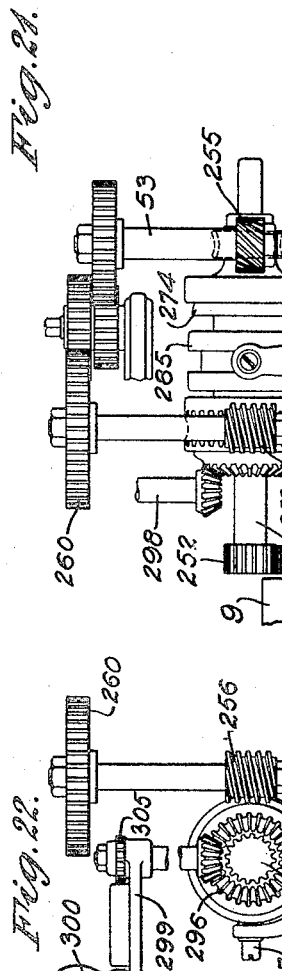
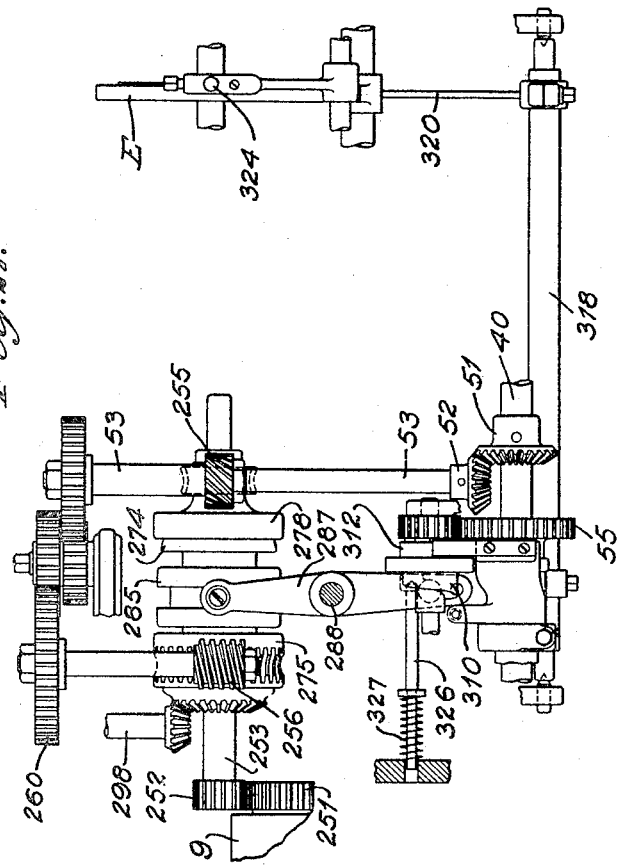
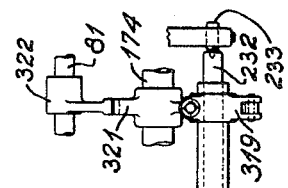
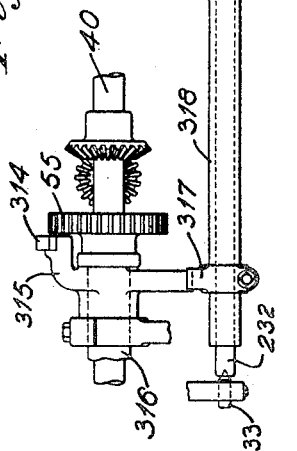
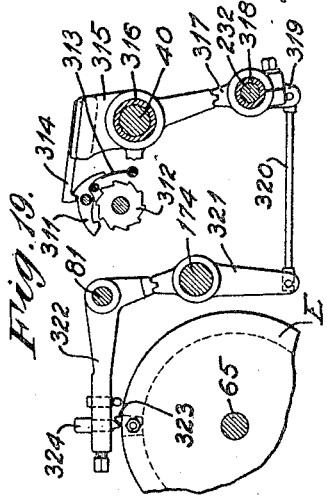
Witnesses:
S. S. Grotta
E. H. Lorenz
Inventor
B. M. W. Hanson
By W. H. Honiss, Att'y B. M. W. HANSON.
METAL SCREW MACHINE.
APPLICATION FILED APR. 7, 1910.
1,133,642.
Patented Mar. 30, 1915.
16 SHEETS—SHEET 10.
*Fig. 23.*
*Fig. 24.*
*Fig. 25.*
*Fig. 22ª.*
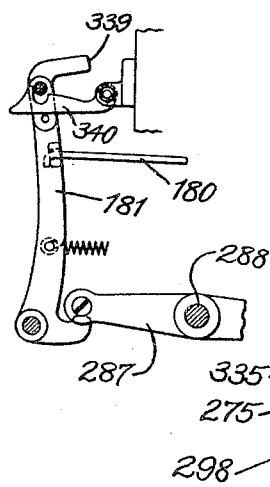
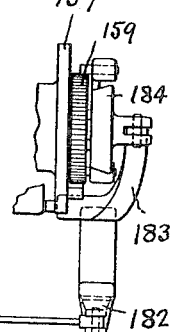
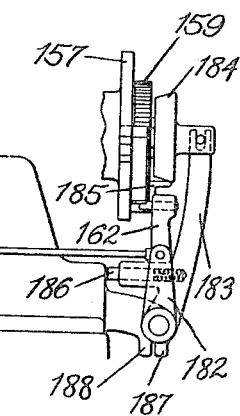
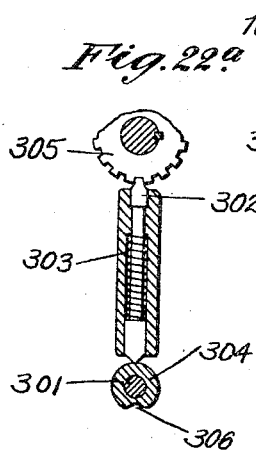
Witnesses:
Inventor
B. M. W. Hanson
By ........ Att'y.

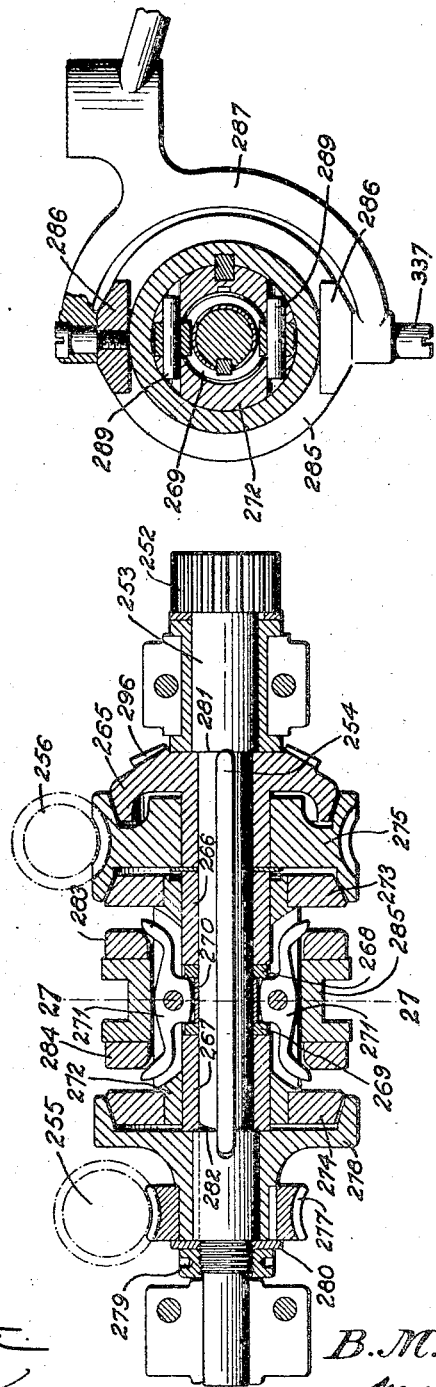

B. M. W. HANSON.
METAL SCREW MACHINE.
APPLICATION FILED APR. 7, 1910.

1,133,642.

Patented Mar. 30, 1915.
15 SHEETS—SHEET 12.

Witnesses:
S. S. Grotta
E. H. Lorenz

Inventor:
B. M. W. Hanson
By W. H. Honiss Atty.

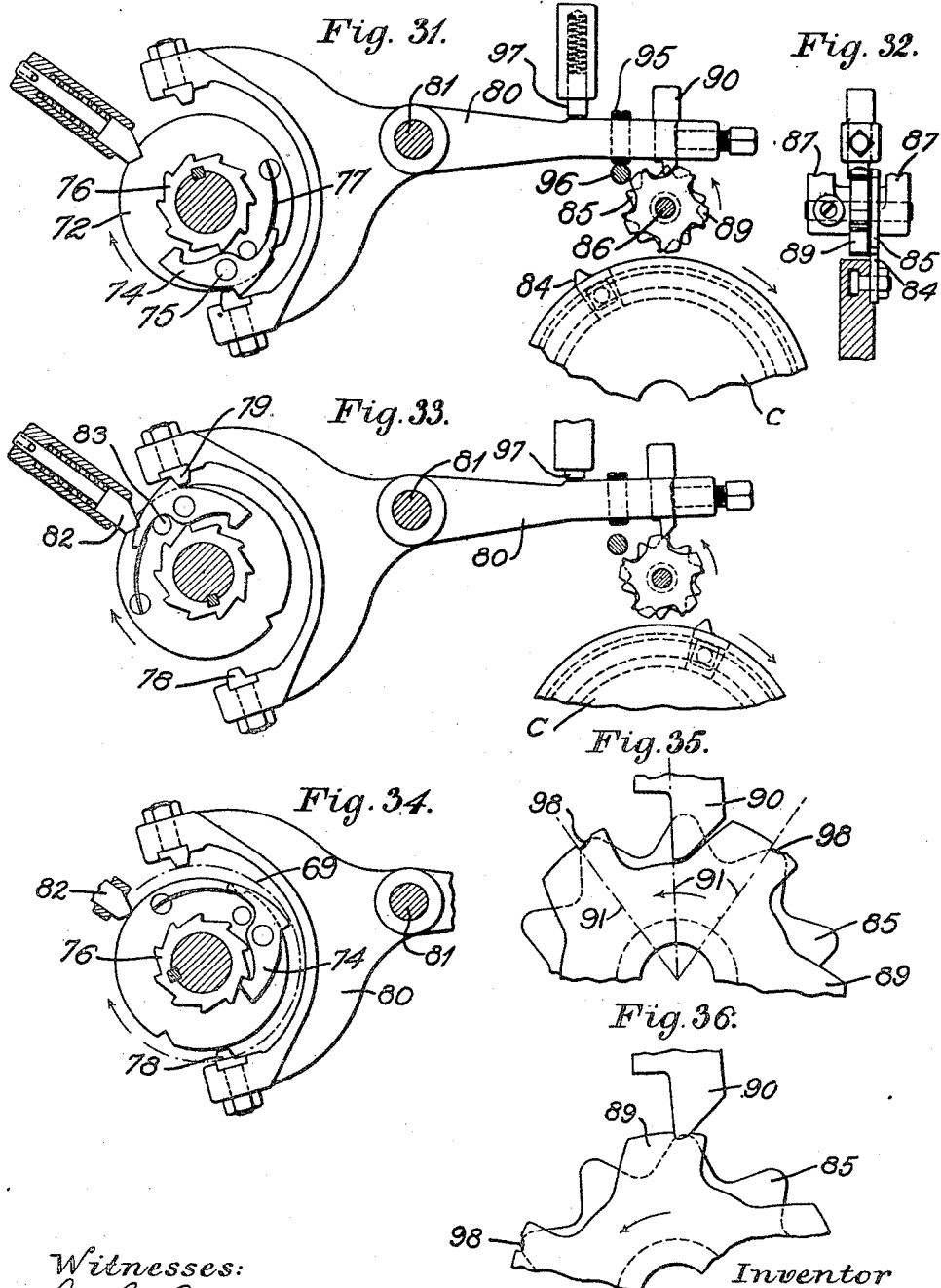

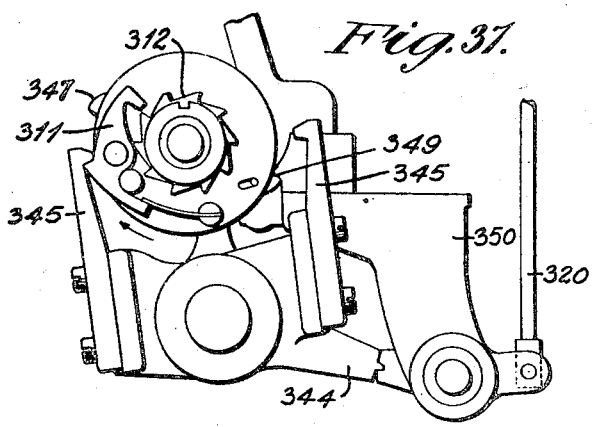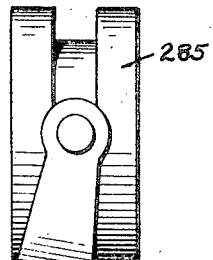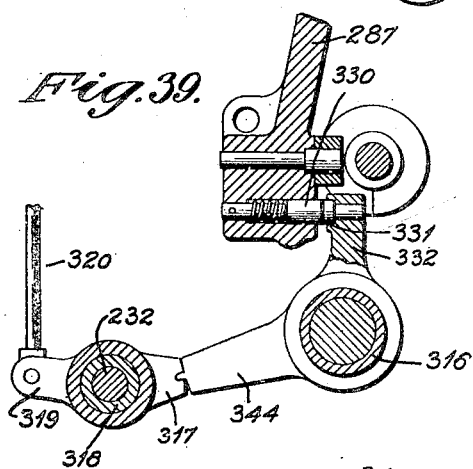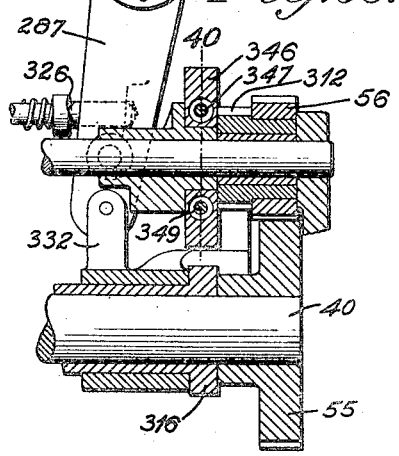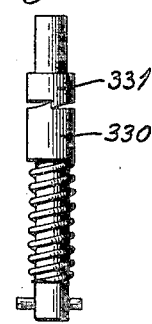

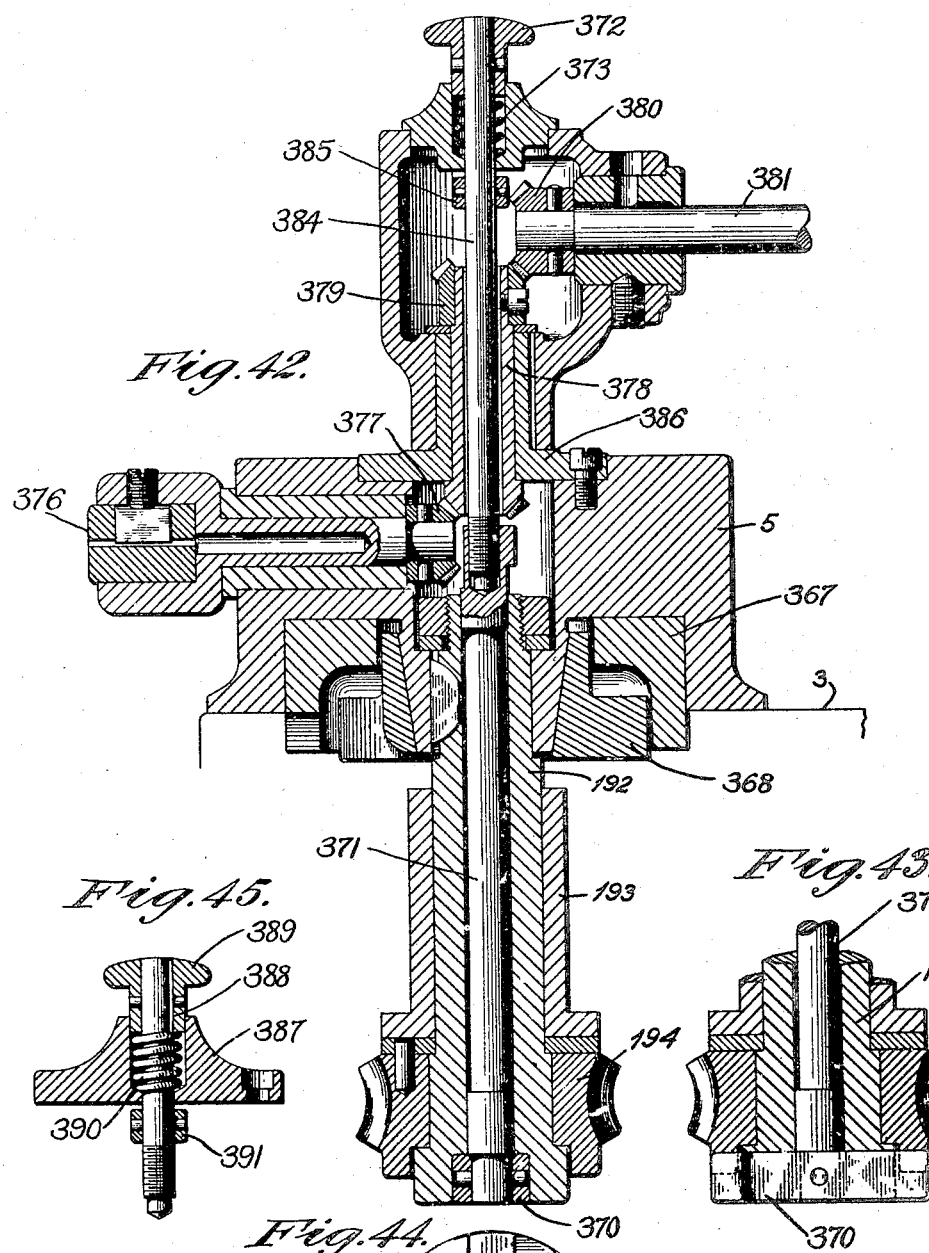

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-SCREW MACHINE.

1,133,642.

Specification of Letters Patent.

Patented Mar. 30, 1915.

Application filed April 7, 1910. Serial No. 553,965.

*To all whom it may concern:*

Be it known that I, BENGT M. W. HANSON, a citizen of the United States, and resident of Hartford, in the county of Hartford and State of Connecticut, have invented certain new and useful Improvements in Metal-Screw Machines, of which the following is a full, clear, and exact specification.

This invention relates to improvements in the organization and in the details of machines of the type now generally known as automatic screw machines, for making metal screws, studs, pins, and similar articles. In such machines a rod of stock is gripped by a chuck carried in a revolving spindle, with a suitable length of the rod projecting beyond the end of the spindle. This projecting end is operated upon in succession by suitable tools mounted in a revolving tool turret, which is turned at the proper intervals to bring the succeeding tools into operative relation to the rod and is fed forward at suitable times and at the proper speed for the proper operation of the respective tools. These tools turn the body, and sometimes the head of the screw, to their proper diameters, cut threads upon the body, point or cup the end of the screw, and otherwise complete it to the desired form, after which the screw is severed from the rod and transferred to auxiliary slotting or drilling mechanism, which cuts a slot in the head of the screw, or drills holes in it, according to requirements, while the other tools are operating upon the succeeding blank. As each completed blank is severed from the rod, the chuck is loosened to release the rod, the rod is fed forward to project its new end a proper distance, the chuck is again closed, and the turret tools begin their work, this succession of operations being automatically repeated on the rod until it is all used up, when it is replaced by a new rod, and so on.

The important features of my present invention which in one of its preferred forms is shown in the accompanying drawings, include both the organization of the complete machine and details of its various parts. An important feature of the improved organization is that whereby the major or principal functions of the machine are performed by separate and practically independent mechanisms, separately controlled from a central location, convenient and accessible to the hand and eye of the operator, who is thereby enabled to observe the timing, both absolute and relative, of the several functions, and to adjust the controlling mechanism so that any function may be hastened or retarded, and otherwise performed in the time best suited to its own requirements, and in suitable succession and time relation to the other functions, without altering the time of other mechanisms, or adjusting or replacing any of the cams or other actuating members.

A further important feature is that whereby a supercontrol is exercised over the control devices, by which they are themselves advanced or retarded in accordance with the progress of the several functions separately controlled by the control devices.

Another important feature of this control system or arrangement resides in the driving and releasing connections between the control devices and the more outlying mechanisms for performing the various functions, whereby the directions indicated by the central control for independently starting and stopping the different mechanisms are carried out with promptness and certainty. These connections, supplementing the central control, establish a firm and definite although elastic and adjustable relation between all of the several functions and the mechanism for performing those functions, giving independent latitude and adjustment to each function, while also confining each to the time assigned to it in the variable program. The advantages of such a system will readily be seen by those familiar with this art when it is compared with former systems, in which the control as to time and movement of the parts is determined by cams having a fixed period of operation, or which are carried upon shafts having a fixed time or rate of rotation, or when compared with systems in which not all of the functions are separately controlled, and are controlled from different portions or different shafts of the machine, more or less remote from each other; all stopping short of complete unitary, central, and independent control.

The invention further comprises various details of construction and arrangement, which contribute to the general advantage of the complete organization.

Some of the features shown and described, but not claimed in this application, are shown, described and claimed in my copending application filed Apr. 25, 1914, and serially numbered 834,321, 834,322, 834,323 and 834,324, respectively.

An improved embodiment of the present invention is shown in the accompanying drawings, in which—

Figure 2:
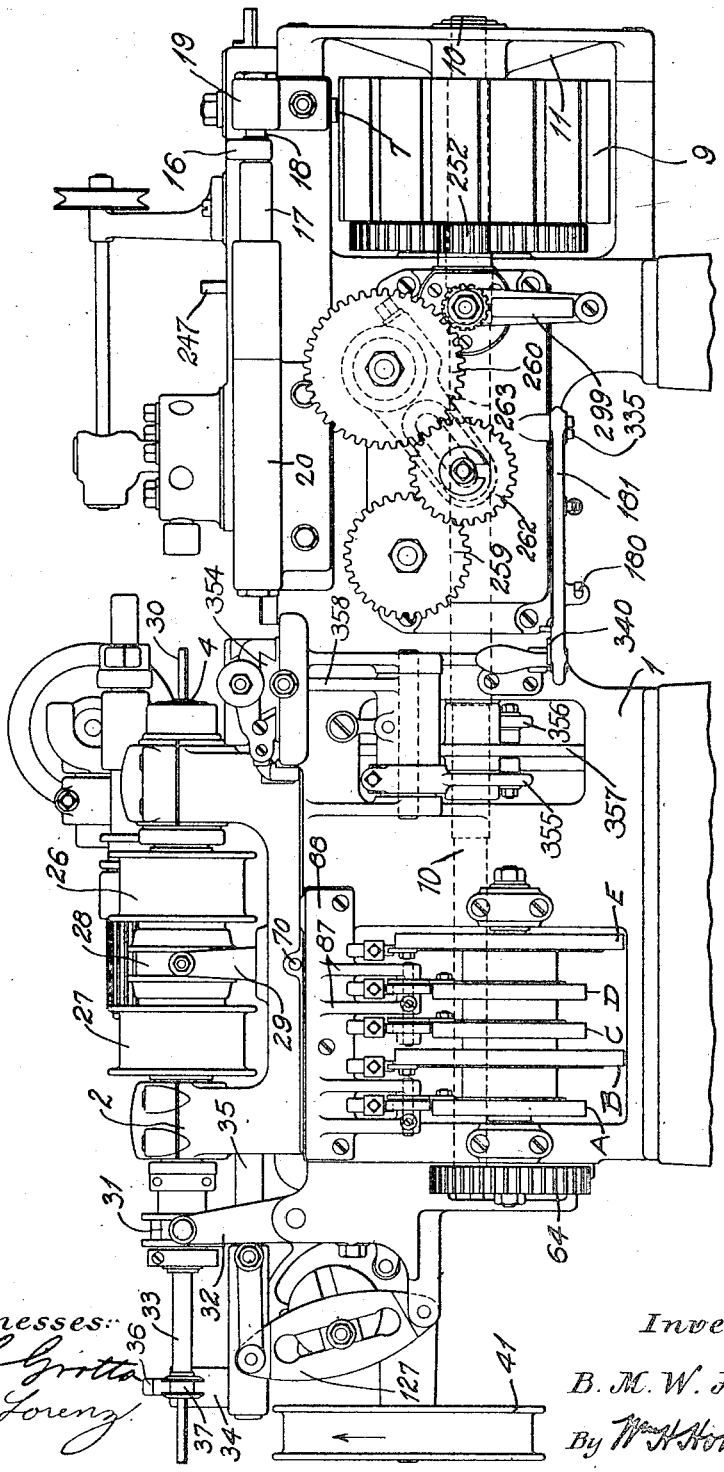
Figure 3:
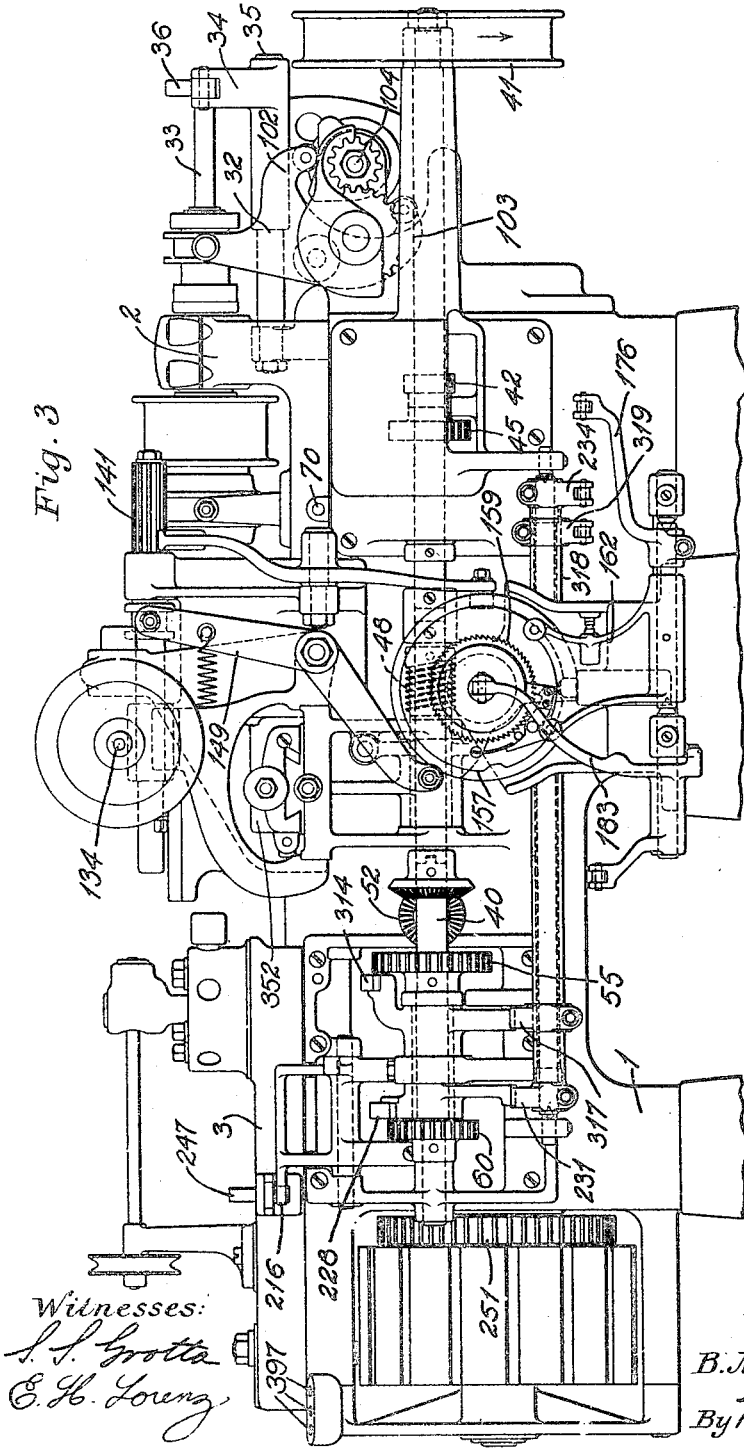
Figure 4:
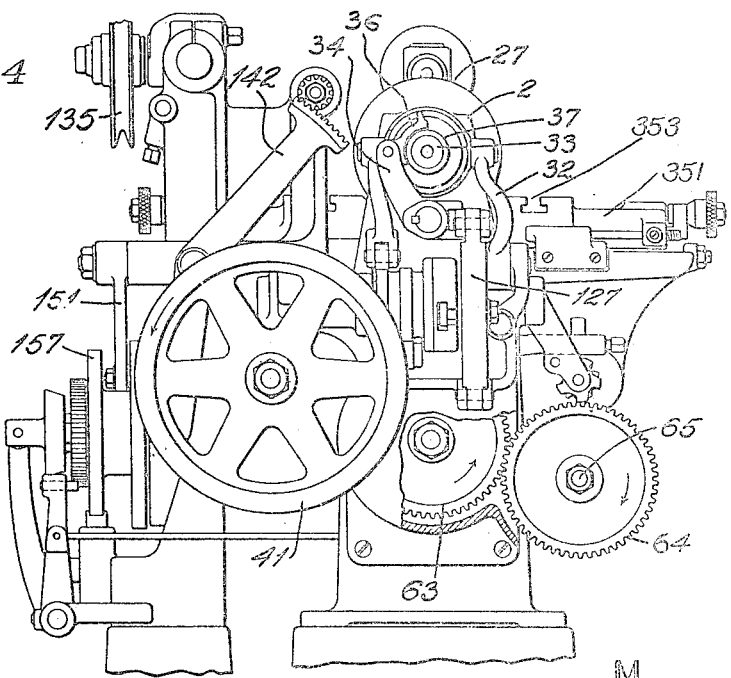
Figure 5:
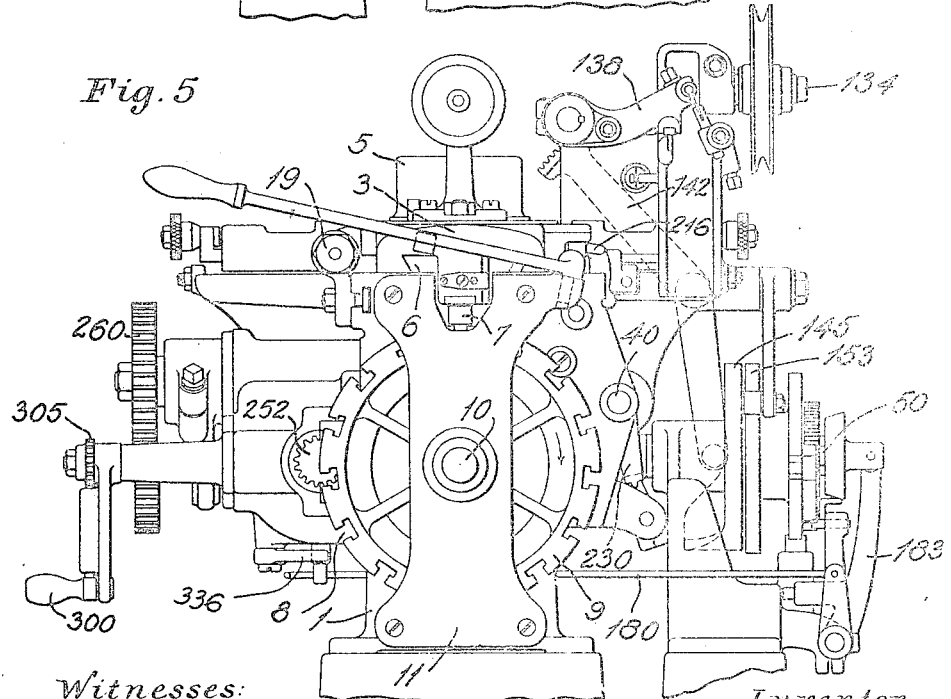
Figure 29:
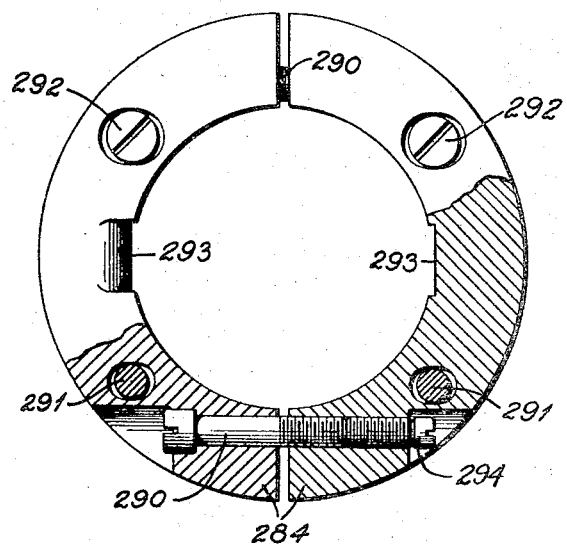
Figure 30:
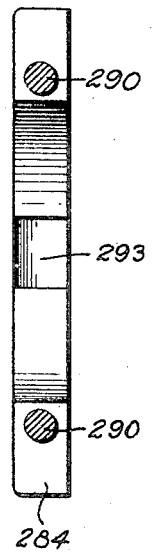
Figure 28:
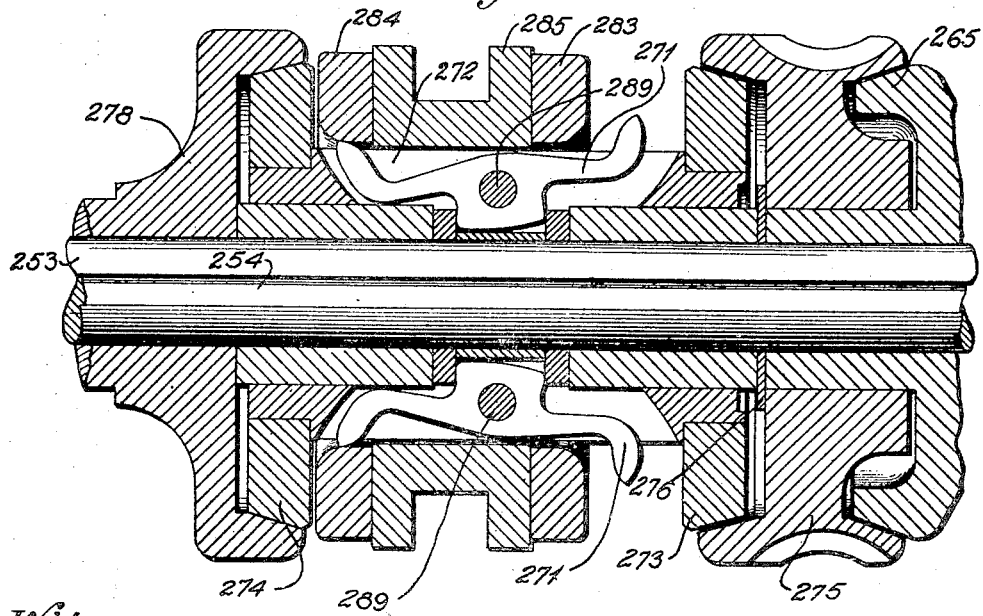

Figure 1 is a plan view, Fig. 2 a front view, Fig. 3 a rear view, Fig. 4 a left hand end view, and Fig. 5, a right hand end view, showing the general construction and arrangement of a complete machine. Fig. 6 is a plan view, showing the driving mechanism for the several parts, serving as a convenient diagram for tracing their relative position and relation. Fig. 6ª is a plan view, supplementary to Fig. 6, of the turret parts. Fig. 7 is an end view partly in section taken on the line 7—7 of Fig. 8, showing the mechanism for controlling and operating the main or stock carrying spindle. Fig. 8 is a front view, and Fig. 9 a plan view of the mechanism of Fig. 7, showing in addition thereto the mechanism for feeding forward the stock and opening and closing the chuck for gripping that stock. Fig. 10 is an end view projected from Fig. 9. Fig. 11 is an end view and Fig. 12 a rear view of the mechanism for removing the screws or other pieces as they are cut from the rod of stock, and for slotting them when desired. Fig. 13 is an end view, Figs. 14 and 15 are rear views, and Figs. 16 and 17 are plan views of the mechanism for controlling and operating the revolving turret, carrying the tools which operate upon the stock. Fig. 18 is an end view projected from Figs. 16 and 17, showing details of construction. Figs. 19 to 22 inclusive illustrate details of the mechanism for increasing and diminishing the speed or rate of progress of the machine. Fig. 19 being an end view, Fig. 20 a rear view, and Fig. 21 a plan view of the operating and controlling mechanism, while Fig. 22 is an end view projected from Fig. 21. Fig. 22ª is a sectional front view of the hand crank connection for operating the machine. Figs. 23 and 24 are plan views, and Fig. 25 is an end view of mechanism for controlling and correlating the operations of the slotting mechanism and the turret slide mechanism. Fig. 26 is a front view in section taken through its longitudinal center, of the clutch mechanism, for driving the mechanism at different speeds. Fig. 27 is an end view projected from Fig. 26 in section taken on the line 27 of that figure. Figs. 28, 29 and 30 show in larger scale the details of the clutch mechanism of Figs. 26 and 27. Fig. 28 is a sectional side view showing the clutch set to drive at the faster of its two speeds. Fig. 29 is an end view partly in section, and Fig. 30 is an edge view of one of the floating collars employed in connection with the clutch of Figs. 26, 27 and 28. Figs. 31 to 36 inclusive illustrate in various operative positions the details of the control mechanism employed for some of the functions of the machine, and which may be employed for any of those functions, as the conditions may make advisable. Fig. 31 is an end view, showing the mechanism stopped in one of the two positions in which it holds out of operation the mechanism controlled by it. Fig. 32 is a front view projected from Fig. 31. Fig. 33 is an end view similar to Fig. 31, but showing the control mechanism in the other of its two positions in which it holds out of operation the mechanism controlled by it. Fig. 34 is an end view, corresponding to a portion of Figs. 31 and 33, but showing its control mechanism in a position intermediate those shown in Figs. 31 and 32, in which the mechanism controlled by it is released and allowed to operate. Figs. 35 and 36 are end views in enlarged scale, showing the cams or star wheels employed for controlling the holding and releasing positions shown in Figs. 31, 33 and 34. Figs. 37 to 41 inclusive illustrate a modified construction of mechanism for controlling and operating the variable speed driving clutch of Figs. 26 and 27. Fig. 37 is an end view, showing the single revolution clutch in one of its resting positions. Fig. 38 is a plan view partly in section showing the clutch lever in one of its clutch positions. Fig. 39 is an end view projected from a portion of Fig. 38. Fig. 40 is an end view, in section taken on the line 40 of Fig. 38. Fig. 41 is a side view showing details of construction of a detent pin shown in Fig. 39. Figs. 42 to 45 inclusive represent the mechanism by which the turret may be released and turned by hand independently of the other mechanism. Fig. 42 is a front view in section taken through the vertical center of the turret. Fig. 43 is an end view projected from the lower portion of Fig. 42. Fig. 44 is an underneath view projected from Fig. 42. Fig. 45 is a side view in section taken through its longitudinal center, of a turret releasing knob, which may be employed upon the turret in place of that shown in Fig. 43 when no drilling attachment is used.

In the preferred embodiment of the present invention herein shown the parts are mounted upon a bed or frame 1. The main spindle head 2 and the turret slide 3 are mounted on the top of the bed, with the spindle 4 in line with the vertical axis of the turret 5. The turret slide is mounted on ways 6, on which it slides in a direction longitudinally of the spindle 4. The rearward end of the turret slide is provided with an anti-friction roll 7, which engages with suitably shaped cam pieces clamped to T-slots 8 cut in the periphery of the cam wheel 9, which is fixed to the cam shaft 10. That shaft extends lengthwise of the bed and its rearward end is preferably also supported outside of the cam wheel 9 by means of a removable bracket 11, which is secured to suitable projections of the bed 1. For the cam wheel 9 and its cam strips I prefer to use the adjustable cam strip construction shown and described in my Patent 855,773 of June 4, 1907, which need not be described in detail herein. The cam roll 7 is secured to the turret slide by means of a bolt 14, which is clamped in a slot 15 in the rearward end of the turret slide, to facilitate adjusting the slide to different longitudinal positions.

Means are provided for cushioning the sliding action of the turret. A projection 16 of the turret slide engages between plunger buffers 17 and 18, the latter of which is mounted in a bracket 19 and is backed up by a suitable spring to form a cushioned stop for the rearward movement of the slide. The plunger 17 is mounted for sliding movement in the bracket 20 and is backed up by a compression spring of a length and tension suited to the weight and length of travel of the turret slide and its appurtenances. The spring may be made stiff enough to be the sole motive power for pushing the slide backwardly, in case cam strips are employed only behind the roll 7 to push it forward against the action of the said spring; and even where cam strips are used on both sides of the roller 7, the spring pressed plunger 17 may serve to take up whatever lost motion there may be between the roll and the cam strips, thus insuring smoothness of action.

The main or work carrying spindle 4 is mounted in the head 2, and is arranged to be rotated in forward and reverse directions or at different speeds in the same direction, by means of pulleys 26 and 27 which are driven by suitable belts from any convenient countershaft, one or the other of the pulleys being clutched to the shaft by any suitable well-known clutch mechanism operated by the clutch sleeve 28 and the yoke 29, by means to be hereinafter described.

The rod of stock 30 to be operated upon is gripped by any suitable and well-known chuck or collet mechanism carried by the main spindle 4, and operated through the collar 31 by means of the yoke 32, which is moved at proper times to open and close the chuck or collet by mechanism to be hereinafter described in its proper place. When the chuck is opened or loosened the rod of stock 30 is fed forward by means of a feed tube 33 of any suitable or well-known construction which is connected with a feed slide 34 mounted on the stud 35, projecting from the head 2. The slide 34 is provided with a dog 36, which is hinged to the feed slide 34 and fits in a grooved collar 37 of the feed tube 33, this hinged construction permitting the dog to be swung out of the groove when it is desired to withdraw the feed tube.

The general character and relation of the driving and control mechanism for the various functions of the machine are best shown in Fig. 6, which is a plan view, showing the control disks and the principal shafting and gearing; the bearings and other parts being omitted for clearness. The main driving shaft 40 rotates in bearings on the bed 1 and is provided with a pulley 41 which is driven by a belt from any convenient motor or shaft. The shaft 40 rotates continuously and has fixed upon it the gear 42, driving the gear 43 on the shaft 44, furnishing constantly running motive power for driving the intermittently operating mechanism shown in Figs. 8, 9 and 10 for opening and closing the chuck in the main spindle 4, and feeding forward the rod or work 30 to be operated upon. The gear 45, fixed on the shaft 40, drives the gear 46 and thus furnishes constant running motive power for the intermittent driving of the mechanism shown in Figs. 7 to 10 inclusive for moving the clutch yoke 29 to drive the main spindle 4 in its forward or reverse directions or at different speeds, as required. The worm 48 meshing with the wheel 49 fixed on the shaft 50 furnishes constantly running motive power for the intermittent driving of the mechanism shown in detail in Figs. 11 and 12 for transferring and slotting the screws, or for performing any other supplemental operation on them.

The bevel gear 51 fixed on the shaft 40 meshes with the bevel gear 52 on the shaft 53, and transmits constant rotation to a train of gearing employed for the variable driving of the main cam wheel 9, its shaft 10 and the central control devices for controlling the successions, and periods of operation of the various functions performed by the machine.

The gear 55 fixed on the shaft 40 drives the gear 56 on the shaft 57 and furnishes a constantly running motive power for the intermittent operation of the clutch mechanism shown in Figs. 21, 22 and 26 to 30 inclusive, for varying the speed at which the main cam wheel 9 and the central control devices are driven. The gear 60 fixed on the shaft 40 drives the gear 61 and furnishes constantly running motive power for the intermittent operation of the mechanism shown in detail in Figs. 13 to 18 inclusive for unlocking, rotating and relocking the tool turret 5. These driving and connecting gears between the driving shaft 40 and the various individual mechanisms should be proportioned and otherwise adapted to transmit a suitable speed to each mechanism, according to their various requirements and functions. The driving gears for each individual mechanism may be changed in proportions, without interfering with any other mechanism, or the speed of the driving shaft 40 itself may be changed by altering the size of its driving pulley 41, or by altering the speed of the belt which drives that pulley. This permits the proper operating speed of the respective mechanisms to be established at their maximum efficiency, without affecting the time of starting each into operation, which latter is otherwise controlled, as will be hereinafter described.

The shaft 10 extending lengthwise of the bed has fixed upon its left hand end the gear 63 meshing with the gear 64 of the shaft 65, which has upon it the adjustable control devices by means of which the periods and the succession of operation of the various mechanisms are initially controlled. These devices in the present instance consist of a series of plates or disks A, B, C, D and E, which are secured to the shaft 65 to turn therewith, and are provided with dogs or tappets seated in slots extending circumferentially around the disks, in which the various tappets may be adjusted and clamped at the proper positions for initiating the respective movements or functions controlled by them. These disks, and the mechanisms directly controlled by them are herein shown to be varied in construction and mode of operation to suit the various functions, or to suit the characteristics of the mechanisms which perform those functions, a detailed description of which will next be given.

For convenience of illustration and description the machine is dissected and the different mechanisms are shown on different sheets, to which reference should be made in following the description.

The main clutch mechanism for operating the yoke 29 to engage the main spindle 4 with the pulleys 26 or 27 to drive the spindle in its forward or reverse direction is best shown in Figs. 7, 8 and 9. The yoke 29 is pivoted at 70 on the bed or frame of the machine, with its upper forked ends engaging a groove in the clutch sleeve 28, preferably by means of shoes 71. The lower end of the lever is provided with a suitable pin or roller engaging with a groove in the cam 72 on the shaft 44, by means of which the yoke 29 is moved back and forth to clutch the main spindle 4 into engagement with its forward and reverse driving pulleys 26 and 27, as may be required by the character of the work to be done. The contour of the groove in the cam 72 is suited for moving the levers into clutching relation to the pulley 26 during one-half of a rotation of the cam, and into clutching relation to the pulley 27 at the other half of the cam rotation. Therefore, provision is made for intermittently rotating the cam 72 half a revolution at suitable intervals, and holding it stationary at those two positions, generally diametrically opposite, at which the cam path holds the yoke 29 in its two extreme or clutching positions. The mechanism for stopping the cam at the proper positions, carrying it forward again to the next position and for controlling the times at which these movements take place, and the intervals between them, is shown in connection with Figs. 7, 8 and 9, some portions being also shown in enlarged scale and in different operative positions in Figs. 31 to 36 inclusive. A driving dog 74 is pivoted at 75 on the end face of the cam 72, or a flange appurtenant thereto, and overlies a ratchet wheel 76, which is secured to the side of the constantly running gear 46. A spring 77 bearing against the rearward end of the dog 74 tends to carry its forward hooked end into engagement with the passing teeth of the ratchet 76, as shown in Fig. 34, this tendency being overcome, for the purpose of stopping the cam at its two resting positions, by a pair of oppositely disposed detents 78 and 79, held in the bifurcated ends of a control lever 80 pivotally supported on the shaft 81, supported by the bed. The detents 78 and 79 operate alternately upon the dog 74, as shown in Figs. 31 and 33, to detach it from the ratchet 76 to stop the rotation of the cam 72, holding it stationary during the desired period, at the end of which the control lever 80 is oscillated, releasing the dog 74 from one detent after bringing the opposite detent within the circle of revolution 69 of the dog, (Fig. 34) which upon being released from the first detent engages with a passing tooth of the ratchet 76, which carries the detent and with it the cam 72, as shown in Fig. 34, through half a revolution, to the position shown for example, in Fig. 33, colliding then with the next detent, which retracts the dog 74 and holds it, along with the cam 72, again in a stationary position for the required period, and so on. A spring-pressed pawl 82 mounted in an adjacent arm or bracket of the framing engages alternately with oppositely disposed notches in the periphery of the cam 72, as shown in Figs. 31 and 33, thus preventing the cam from turning backwardly from those positions when its forward movement is stopped by the detents 78 or 79, this tendency to turn backwardly being due to the pressure of the spring 77 against the rearward end of the dog 74 acting between the pivot 75 and the detent. This backward turning movement, if allowed, would let the hook of the dog 74 back against the ratchet teeth, which would make an unpleasant clicking noise besides unduly wearing the parts. A stop pin 83 is preferably provided in the cam 72 to stop the swinging movement of the dog 74 in the direction to which it is carried by its unlatching movement. The rearward edge of the end of the pawl 82 is beveled, to enable it to ride out of the notch when the cam 72 starts forward.

The oscillating movement of the control lever 80 is in this instance shown to be imparted by tappets 84 secured to the control disk C and engaging like a single gear tooth with the star wheel or pinion 85 which is mounted for rotation on a shaft or stud 86 supported by arms 87 from a bracket 88. Side by side with and secured to the star wheel 85 is the cam or wiper 89, which engages with the suitably shaped end of a cam pin 90 removably secured in the forward end of the control lever 80. An adjustable stop screw 95 in the lever 80 abutting against a fixed pin 96 enables the lower position of the lever shown in Figs. 7 and 31 to be adjustably maintained, and a spring-pressed plunger 97 mounted in a suitable fixed portion of the frame holds the lever 80 yieldingly down against the stop pin 96. The cam or wiper 89 is provided with a succession of lobes with depressions between them, these lobes operating during the step-by-step advance of the cam 89 to alternately raise the lever to the position shown in Fig. 33, and let it back again to the position shown in Fig. 31. The preferred form of these cam lobes and their successive positions is best shown in the enlarged views Figs. 35 and 36. The angular extent of each advance movement is shown by the radial lines 91, and the lobes are preferably arranged to move the lever 80 at or near the beginning of each advancing movement. Notches 98 are preferably made in the raised portions of the cam lobes to receive the point of the cam pin 90, as shown in Fig. 36 to retain the cam in that position and prevent accidental displacement during the time that the tappets 84 are out of engagement with the star wheel 85. That star wheel is herein shown to be provided with ten teeth, and it is advanced a distance of one tooth by each of the tappets 84, a number of these tappets being provided, suited to the number of times the clutch yoke 29 must be operated for each piece of work made, the shaft 65 being geared to the rest of the machine so as to rotate the control disks A, B, C, D and E, once for each completed piece of work.

The mechanism by which the chuck is opened, the stock fed forward, and the chuck again closed at the proper periods, is best illustrated in Figs. 8, 9 and 10. The collar 31 is appurtenant to a sleeve which extends through the main spindle 4 and operates a chuck or collet within that spindle in any well-known way, by the longitudinal movement of the collar and sleeve, that longitudinal movement being imparted by the yoke 32, which is pivotally mounted at 101 on the bed or framing, and is provided with cam arms 102, 103, which extend in different planes on opposite sides of the cam shaft 104, and engage with different cams thereon, the arm 102 engaging with the cam 105, and the arm 103 engaging with the cam 106, preferably using the customary anti-friction rollers. The two cams 105 and 106 are of contours suited for rocking the yoke 32 at suitable times for opening and closing the chuck, leaving the arms free at the resting positions of the cams, as shown in Fig. 8, to allow the chuck to be opened and closed by hand, it being sometimes desirable to remove the work for examination before cutting it from the rod.

The cam shaft 104 is mounted in suitable bearings in the bed, and is provided with a gear 107, which meshes with the gear 108, which in turn is driven by a pair of spiral gears 109 and 110. The latter gear is mounted on the shaft 111, which is supported in suitable bearings, and has upon its opposite end a flange 112, which has pivotally mounted thereon a dog 113, overlying a constantly rotating ratchet 114 carried by the side of the gear 43 (Figs. 7, 8 and 9). This stop and releasing mechanism is similar to that already described in connection with Figs. 31 to 36 inclusive. A control lever 115 pivoted on the shaft 81 is provided at its forward end with a cam pin 116, engaging with a lobed cam 117 driven by a star wheel 118 and tappets 119 on the control disk A. The construction and mode of operation of this stop release and control mechanism is so nearly identical with that previously described in connection with Figs. 31 to 36 inclusive that no further specific description of this set of mechanism is needed. In this case, however, with the single lobed cams 105 and 106 herein shown, the ratio of gearing between the flange 112 and the cam shaft 104 should be such as to impart a complete rotation to the shaft 104 for each half rotation of the flange 112, and a single tappet 119 should be employed on the controlling disk A so as to allow one complete rotation of the cam shaft 104 for each piece of work completed, corresponding to a single rotation of the control shaft 65. Obviously, however, this arrangement may be modified, using different cam contours and a suitable number of tappets, according to the number and character of the movements required for each piece of work completed.

The mechanism for feeding the rod of stock forward through the chuck or collet while the latter is opened, being so directly related to the chuck opening and closing movements, is herein shown to be controlled as to the time of its operations by the same control mechanism employed for controlling the time of the opening and closing movements of the chuck; and is also in part driven by the same train of driving mechanism. The shaft 104 has fixed upon its end the crank plate 124, the face of which is slotted to receive a crank pin 125 which may be clamped at any suitable radial distance from the center of rotation of the crank plate, to impart the desired movement. The crank pin engages in a slot 126 of a slotted lever 127, which is pivoted at 128 to the bed or frame, and at its upper end it is pivotally connected by the pitman 129 to the slide 34, the upper end of which is connected by means of a hinged dog 36 to the grooved collar 37 of the feed tube 33. That tube may be of the ordinary construction, in which the forward end is split and yieldingly clamps the rod with sufficient friction to push it forward through the opened chuck, but yields enough to slide over the rod as the tube is drawn backwardly after the rod has been gripped by the chuck. The amplitude of the forward and back movement, suited to the length of stock to be fed at each movement, is determined by adjusting the crank pin 125 in its slot in the crank plate 124 to a suitable radial distance from the center of rotation of that crank plate, and the time of its movement is determined by the control apparatus shown in Fig. 7, which also controls the time of the mechanism for opening and closing the chuck. The mechanism for slotting or for performing other supplemental operations upon the screw or other article being made, and transferring devices for transferring the screw from the chuck to the said mechanism, is best shown in detail in Figs. 11 and 12. A drill, saw, or other tool suited for the desired operation, in this case a slotting saw, is mounted in a suitable spindle, as 134, driven by a pulley 135 from any convenient source of motive power. The screw or other article to be operated upon, designated by 136, is received and held in a sleeve, chuck, or collet 137, adapted to properly receive and grip the article. This chuck or collet is carried in the end of an arm 138, which is mounted for swinging movement on or with the shaft 139, to carry the screw or other work after it is severed from the rod of stock 30, through the arc of movement indicated by the dot-and-dash line 140, to the resting position shown in Fig. 11. For this oscillatory movement of the arm 138, its shaft 139 is provided with gear teeth 141, meshing with a sector gear 142 mounted on the stud 143. A pin or anti-friction roller 144 in the lower end of the sector gear engages with a cam 145 which is fitted to turn loosely on the shaft 50, the contour of which is adapted to produce the desired oscillatory movement of the arm 138 represented by the dot-and-dash arc 140. After the work 136 is carried to the position shown in Fig. 11, the cutter or drill may be carried against it, or, as is herein shown, the arm 138 and its shaft 139 may be moved lengthwise to carry the work against the cutter. The grooved collar 148, fixed on the shaft 139, is engaged by a suitable shoe carried in the end of the arm 149, which is fixed on one end of the shaft 150, journaled in the bed, the other end of the shaft having fixed upon it the cam arm 151, the lower end of which is provided with a suitable pin or antifriction roller 152 bearing against the cam 153, the contour of which is suited to the desired movement. It may be a closed cam, or an open sided cam like that shown herein, in which case a spring 154, or equivalent device is employed to make the roller 152 follow the contour of the cam, as the latter revolves. If the cam 145 is an open cam, a similar spring 146 should be employed to make the lower end of the sector 142 follow the contour of the cam, so as to compel the arm 138 to make its full stroke in accordance with the timing of the cam. A suitable supporting guide 155, may be employed suited to the nature of the work, for supporting and guiding the arm 138 when in the position shown in Fig. 11, and during the time that the saw or drill, or other implement is operating upon the work 137. A stripper 156 may also be employed to facilitate withdrawing the slotted screw from the chuck.

The cams 145 and 153 determine the amplitude and rate of movement of the sector 142 and the arm 149; but the time or period at which they are thrown into and out of operation is determined by a device similar in many respects to that which controls the time of the other devices already described. A flange 157 appurtenant to the cams 145 and 153 and mounted with them to turn loosely upon the shaft 50 has pivotally mounted upon its rearward side a dog 158 which overhangs the teeth of a ratchet 159 secured to and constantly rotating with the shaft 50, and when released is carried into contact with the teeth of that ratchet by the spring 160, the parts being arranged in this instance to impart either a complete rotation or intermittent partial rotation to the flange 157 and the cams 145 and 153. At the conclusion of the desired rotation, or partial rotation, the dog is withdrawn from contact with the ratchet 159 by means of one or both of the detents 161 and 167 in the end of the arm 162, mounted on the shaft 163, which is herein shown to be pivotally supported on removable centers 164 and 165, these centers being easily retracted from the shaft to facilitate the assembling and disassembling of the parts. A spring 166 is provided for holding the arm yieldingly during the position shown in Fig. 11 in engaging relation to the dog 158. The two detents 161 and 167 are employed when the nature of the work makes it desirable to arrest the operation of the mechanism for a period of time, or to divide it into two periods, or two operations, as for example, while the collet, after engaging with the screw waits for the latter to be severed from the rod. The arm 162 may be extended to cover the entire circle of revolution of the dog 158, and detents like 161 and 167 may be located at any desired portions of that circle. The movements of the arm 162 to release the dog 158 are initially controlled by a tappet or tappets 170 on the control lever 172, the construction of which is practically identical with the control levers 180 and 115, already described. In this case, however, unlike the former instances, the tappet or tappets 170 act directly upon the tappet pin 171 instead of acting through intermediate star wheels and cams. The control lever 172 engages by a gear tooth connection with the arm 173, which is pivoted on a shaft or stud 174 and has mounted on its lower end the connecting rod or link 175 connecting with the arm 176 on the shaft 163. By this arrangement the tappet 170 in passing the pin 171 raises the lever 172 and at once lets it drop again. The raising movement operates through the described connections to withdraw the detent 161 from the dog 158, thus allowing the latter to engage the ratchet 159 and thus rotating the cams 145 and 153, until stopped by the detent 167 or 161 after partial or complete rotations. In order to hold the cams against reverse rotary movement, due to the pressure of the spring 106 when the dog is disengaged by the detents 161 or 167, a spring pressed plunger 177 mounted in the bed engages with recesses 178 in the periphery of the flange 157. Those spring plungers serve the same purpose as that served by the spring plunger 82, already described.

Means are also provided for manually stopping the rotation of the cams 145 and 153 at any portion of their rotative movement in addition to, and independently of, the detents 161 and 167. A rod 180, extending through to the front of the machine in operative relation to a stop lever 181, connects with an arm 182 mounted to turn freely on an extension of the supporting center 165. That arm is integral with or appurtenant to an arm 183 which extends upwardly into engagement with a friction disk 184 mounted for free sliding movement on the rearward end of the shaft 50. That disk has a beveled or tapered periphery, which when the rod 180 and its connections 182 and 183 are drawn forward, engages with an ear 185 of the dog 158, and swings the dog out of engagement with the teeth of the ratchet 159, at whatever portion of its rotation it may be. The continued movement of the disk 184 brings its forward face against the face of the ratchet 159, thus acting as a brake to stop further rotation, due to momentum. In this way the automatic control may be dominated by manual control, and the continued operation of the control 172 by the tappet 170 would have no effect in starting this department of the machine into operation. A spring pressed plunger 186 is preferably employed between the arm 183 and the bed of the machine, to move these manual control parts rearwardly and release the dog when the stop lever 181 is released, the backward or open resting position of these parts being determined by a stop 187 appurtenant to the arms 182 or 183, engaging with a similar stop 188 of the bed.

The mechanism for rotating the turret for locking it in its working positions, and unlocking it to permit its rotative movement is best shown in Figs. 13 to 18 inclusive and Fig. 42. The turret 5 is mounted for rotation on the turret slide 3. A sleeve 192 having its upper end firmly secured to the turret 5 is journaled in a vertical position in the turret slide 3, preferably within a bushing 193. Secured upon the lower end of the sleeve is a worm gear 194 which meshes with a worm 195 on a splined worm shaft 196, mounted on the bed of the machine. The worm is moved along the shaft with the turret slide, to keep it in mesh with its worm gear during the movement of the slide, by means of projections 197 which encircle the shaft 196 at the ends of the worm. The worm shaft 196 has fixed upon it a gear 198 which meshes with the gear 199 which is mounted to turn loosely on the shaft 57. The end of the hub of the gear is notched to form a clutch face 201 which engages with the similar face of the hub of the gear 61, which is also mounted to turn loosely upon the shaft 57. The gear 61 is driven constantly by the gear 60 on the shaft 40, and has fixed upon its side face the ratchet wheel 202. A spring pressed plunger 203, mounted in the bed and bearing against the side face of the gear 199, tends to push the clutch face 201 into engagement with its coöperating clutch face of the gear 61. The clutch faces are forced apart against the pressure of the spring plunger by the beveled end of an arm 204 appurtenant to the turret locking and unlocking mechanism, which engages with one or the other of the clutch pins 205 projecting from the gear 199 (see Figs. 15 and 18). The operation of this mechanism will be further described in connection with the turret locking and unlocking mechanism, with which it is intimately associated.

The turret when in its resting positions is locked against rotation on the turret slide, by means of a lock bolt 210, which is fitted to slide in the turret slide, and enters suitably spaced recesses 211 in a locking ring 212, appurtenant to the turret. The lock bolt 210 is connected by means of a toothed sector or arm 213, with a cross slide 214, which is fitted in the turret slide to slide transversely thereof, and is provided at its rearward end with a pin or antifriction roller 215, which bears against the face of an operating arm 216, which extends parallel with the turret slide a sufficient distance to remain in engagement with the roll 215 throughout the movement of the turret slide, thus enabling it to operate the turret lock at any position of the turret and slide. The operating arm 216 is supported for turning movement on the shaft 217, and is provided, in addition to the arm 204 already referred to, with a cam arm 218, which bears by means of a suitable pin or antifriction roller, against the cam 219, mounted loosely on the shaft 57. That cam 219 is of a contour suitable for retracting the lock bolt 210 through the connections just described at each half revolution of the cam; and the cam contour is therefore duplicated on diametrically opposite portions of its periphery, as shown in Fig. 18. As a means for pushing the locking bolt to its closed position, a spring 220 is provided, preferably in the turret slide, bearing against a plunger 221, which in turn bears against a downwardly projecting pin or lug 222 of the locking bolt 210 (Fig. 14). A spring 209 attached between the arm 216 and any convenient portion of the frame holds the cam arm 218 against its cam 219, retracting the arm 216 from the turret locking devices carried by the slide, thus leaving the bolt free to shoot into the succeeding locking recesses 211. A half revolution is imparted to the cam whenever it is desired to unlock the turret, by means of intermittently operated mechanism shown in Figs. 13 and 14, similar to that already described for similarly operating other mechanisms of the machine. Attached to the cam 219 is a disk or flange 223 upon the opposite face of which is pivotally mounted a dog 225, situated in the plane of the ratchet 202, with which the dog when released is pressed into engagement by means of the spring 227. The dog is released from the ratchet 226 and held out of engagement by means of the oppositely disposed detents 228 and 229, appurtenant to a rocking lever 230 mounted for rocking movement on the shaft 40 or on a suitable bushing or sleeve within which that shaft is journaled. The lower end of the lever has a toothed engagement with an intermediate lever 231, which is secured upon the end of the shaft 232 supported by the centers 233, or in any other convenient way. The opposite end of that shaft has fixed upon it an arm 234 connected by means of the rod 235 with the lever 236 turning on the shaft or stud 174, and having a toothed engagement with the control lever 238 on the pivot shaft 81. The forward end of the control lever projects over and is operated by the control disk D, by means of a tappet 239 on the control disk D on the shaft 65, through the intervention of a star wheel 240 and cam 241, the star wheel being turned by the tappet 239 and the cam operating against the cam pin 242 to raise and lower the arm 238 alternately at succeeding rotations of the disk D. The general arrangement and operation of this mechanism is like that shown in Figs. 31 to 36 inclusive already described, and operates in substantially the same way to determine the time of withdrawing and releasing the locking bolt 210. It also serves to put in operation at the proper time the mechanism for rotating the turret, after the locking bolt is withdrawn, operating as to this function, in conjunction with the cam 219. When the control lever 238 is raised it operates through the connecting mechanism to raise the detent 228 and thus withdraw it from the dog 225, which, engaging with the ratchet 226, makes half a revolution, carrying with it the cam 219.

As the operating arm 216 is moved by the cam to withdraw the locking bolt, its clutch arm, which at its lower end is beveled at 243 as shown in Fig. 15, is carried away from whichever one of the clutch pins 205 it may have been in engagement, thus releasing the gear 199 to the operation of the spring plunger 203, which thereupon pushes the clutch face 201 into engagement with the coacting clutch face of the gear 61, thereby rotating the turret, through the gears 199 and 198, the worm 195, and the worm gear 194. When the desired partial rotation is complete, the contour of the cam 219 permits the operating arm 216 to return to the position shown in Fig. 18, thus bringing the beveled end 243 of the arm 204 into engaging relation to the succeeding clutch pin 205 thus moving the gear 199 endwise, and thereby detaching the clutch face 201 from the corresponding clutch face of the gear 61, stopping the rotation of the turret. The same movement of the arm permits the locking bolt 210 to be carried by its spring 220 into the succeeding locking notch 211 of the turret. Having thus completed its cycle of operation, the dog 225 is withdrawn by the detent 229, stopping the mechanism, to be again released by the next tappet 239 of the control disk D. The flange 223 is provided with backwardly facing teeth 245, which alternately engage with the spring plunger 246 to hold the mechanism in its resting position shown in Fig. 13, against the tendency of the spring 227 to retract that mechanism. The function of this device is similar to that already described in connection with the pawl 82 and its operating notches on the disk 72, shown in Figs. 31 and 33. The cross slide 214 is provided with a knob or handle 247 projecting through a slot in the top of the turret slide, or arranged in any other convenient way to enable the lock bolt 210 to be withdrawn by hand.

The mechanism for driving the tool feed mechanism is best shown in detail in Figs. 19 to 30 inclusive. The tool feed cam 9 as already described is mounted upon the shaft 10 and is provided with a gear 251 driven by a pinion 252 on the shaft 253 mounted in suitable bearings in the bed, as best shown in Figs. 26 and 27. Different rotative speeds are imparted to this shaft by clutch mechanism which connects the shaft with different driving trains, running at different speeds. In the present instance provision is shown for driving the shaft, and through it the cam wheel 9, at two different speeds, by means of the worms or spiral gears 255 and 256, the arrangement and driving connections of which are best seen in Fig. 6. The worm 255 is mounted on the transverse shaft 53, which as already described receives its rotary movement through the gears 51 and 52 from the driving shaft 40. The shaft 53 extends through to the front of the machine where it is connected with the shaft 258, carrying the worm 256, by means of a train of gears. The gears 259 and 260 fixed on the ends of the shafts 53 and 258 respectively, are connected by intermediate gears 261 and 262 mounted side by side upon a yoke 263. By making suitable changes in the sizes of these gears, which can readily be done from the front of the machine, the ratio of speed between the worm 255 and the worm 256, may be varied to any desired extent.

The clutch and control mechanisms for changing the speed of the cam wheel 9 at the desired times during the operation of the machine will now be described (Figs. 26 to 30). Keyed upon the shaft 253 by means of the key 254 are the friction disk 265, sleeves 266 and 267, the collars 268 and 269 and the distance or filling piece 270. The collars 268 and 269 are preferably hardened and form abutments for the thrust of the oppositely disposed clutch fingers 271, which are mounted upon pivots 289 in longitudinal slots in the clutch sleeve 272; and provided with inwardly extending projections acting somewhat like large gear teeth between the collars 268 and 269. The clutch sleeve 272 is splined for sliding movement upon the sleeves 266 and 267, and has upon its opposite ends the friction disks 273 and 274. A worm gear 275, driven by the worm 256, rotates constantly between the two friction disks 265 and 273, being preferably mounted on the hub of the disk 265, a collar 276 or equivalent means being employed to prevent endwise movement of the worm gear toward the disk 273, so that when the disk is drawn away from driving engagement with the gear, the latter will not follow the disk.

Another driving friction disk 278, driving the disk 274, is mounted to turn loosely upon the shaft 253, and has keyed to it the worm gear 277, which is driven constantly by the worm 255. The friction disk 278 is prevented from endwise movement in one direction by the sleeve 267 and in the other direction by a suitable collar 279, and washer 280 on the shaft 253. By the rocking movement of the clutch fingers 271 toward the right the sleeve 272 is moved endwise in the same direction, so as to grip the gear 275 between the disks 265 and 273, and when the fingers are rocked in the opposite direction the disk 274 is moved into frictional contact with the driving disk 278. The thrust of the clutch fingers is taken by one or the other of the collars 268 and 269, which in turn are supported by the sleeves intervening between those collars and the shoulders 281 and 282. This rocking movement of the clutch fingers is imparted by collars 283 and 284, which are shown in detail in Figs. 29 and 30, and are loosely secured to the sides of the clutch collar 285, which is grooved to receive suitable shoes 286 carried by the clutch yoke 287, which is pivotally mounted upon the stud 288 supported by the bed or frame. The collars 283 and 284, as shown in Figs. 29 and 30, are each made in two halves, which are adjustably secured together by screws 290 and each half is loosely attached to the side of the clutch collar 285 by means of guiding pins 291 and screws 292, so that each collar instead of being held in exact concentric relation to the clutch collar 285 and the shaft 253, is free to "float" with the clutch fingers slightly out of their central position, to accommodate variations that in practice are liable to occur either initially or as a result of wear, in the clutch fingers or their connections. This provision enables the collars 283 and 284 as they are pushed endwise by the clutch collar 285 to distribute its pressure equally upon the ends of the clutch fingers 271, thus distributing the strains equally, avoiding cramping action, and conducing to smooth and balanced movement of the parts during the clutching operations in either direction. This construction and arrangement enables the collars to be easily and accurately adjusted independently of each other to take up the wear of the clutch, the adjustment being automatically distributed by each float ring, so as to bring the added or altered pressure equally upon its two clutch fingers without any attention to that end on the part of the adjuster. Thus a suitable gripping friction for the disk 273 is obtained by adjusting the collar 283, and for the disk 274 by adjusting the collar 284. This adjustment of the collars is effected by drawing their two halves together by means of the screws 290, checking them at their set positions in any convenient way, as by screws 294. The floating collars are preferably flattened at 293 for receiving the ends of the fingers 271, thus providing for good working contact and aiding to maintain the collars in proper register with the rings, and also keeping the direction of adjustment of those collars coincident with the direction of the swinging movement of the fingers.

In addition to the means thus described for driving the feed cam 9 by power at varying speeds under automatic control, provision is also made for turning it and its connected driving shafts of the machine by hand. A bevel 296 meshes with a beveled gear 297 on the shaft 298, which is journaled in the bed, and extends through to the front of the machine, its front end being provided with hand crank mechanism which may be connected to or disconnected from the shaft 298, consisting of the crank arm 299 having a handle 300, which is mounted to turn freely on a shaft or stud 301 fixed in the crank arm 299 (Fig. 22ª). A clutch bolt 302 is fitted to slide lengthwise in the crank handle 299, with its outer end pressed, by means of the spring 303, into engagement with the hub 304 of the handle 300. The opposite end of the bolt is shaped, for clutching engagement with notches in a clutch plate 305, fixed on the shaft 298. A hub 304 is provided with a recess 306, which when turned into coincidence with the outer end of the clutch bolt, permits the bolt to be withdrawn from the teeth of the clutch plate 305, thus disconnecting the crank arm from driving engagement with that shaft, in which condition the arm hangs idly on that shaft. When it is desired to turn the machine by hand, the handle 300 is turned on its stud 301, carrying the end of the clutch bolt 302 out of the recess, and moving its opposite end into a notch of the clutch plate 305, which thus clutches the crank to the shaft 298, and thence through the train of gears already described to the cam wheel 9 and the driving shafts of the machine. Upon completing the desired hand movement of the cam wheel, the crank handle 300 may be again disconnected from the shaft, by turning the handle 300 until the clutch bolt 302 is retracted by its spring into the recess 306, whereupon the crank hangs stationary, as shown in Fig. 2, until again wanted.

The clutch yoke 287 is operated to clutch either the slower or the faster driving mechanism into engagement for driving the cam wheel 9, under the control of the control disk E. (Figs. 6, and 19 to 22.) The rearwardly extending arm of the clutch yoke is provided with a suitable pin or antifriction roller engaging with the face of the cam 310 mounted to turn loosely on the shaft 57. The flange of the cam has mounted upon it a dog 311 which overhangs a ratchet 312 appurtenant to the constantly running gear 56 already described. A spring 313 tends to press the dog into engagement with the ratchet, the latter being held out of engagement during its resting periods by means of the detent 314 appurtenant to the arm 315 which is pivoted for rocking movement on the shaft 40, or on a bushing 316, surrounding that shaft. The arm 315 has a gear tooth connection with the arm 317, which is clamped to a sleeve 318 supported on the shaft 232 already described, the opposite end of the sleeve being provided with an arm 319 which connects by means of a rod 320 with the lever 321 mounted on the shaft 174 and connected by a gear tooth engagement with the control lever 322. That lever is supported on the shaft 81, and extends forwardly over the control disk E, which is provided with a tappet 323 engaging with a pin 324 of the lever. Suitable springs and stops are provided, as in the case of the other control mechanisms hereinbefore described, and the mechanism operates when the dog 311 is released by the movement of the tappet 323 to impart a single rotation to the cam 310. A plunger 326 under the pressure of a spring 327 bearing against a fixed portion of the bed, engages with the clutch yoke 287, holding it against the face of the cam 310, which when in its resting position with the clutch arm 287 resting against it, as shown in Fig. 21, grips the friction disks 273 and 265 to the slower running worm wheel 275, thus imparting the slower of the two speeds to the cam wheel 9. When, however, it is desired to run that cam wheel at a faster speed, a tappet 323, adjusted in suitably timed position on the control disk E, operates through the control lever 322 to release the detent 314 from the dog 311, which by its consequent engagement with the ratchet 312, imparts a single rotation to the cam 310, which moves the clutch yoke 287 to its opposite extreme position, moving the friction disk 274 into engagement with its driving friction disk 278, thus driving the cam wheel 9 by means of the quicker running worm gear 277. In the arrangement shown in Figs. 19 to 22 inclusive, employing a single detent 314, the cam 310 makes a complete revolution before coming again to rest; and in order to provide for retaining the clutch yoke 287 in its position for clutching the mechanism to the worm gear 277, the clutch yoke is provided with a spring plunger 330, the upper end of which forms a latch engaging with the catch 331 on the arm 332 of the detent arm or lever 315. The upper face of the plunger 330 is beveled, which enables it to ride under the catch against the pressure of its spring. After carrying the clutch yoke to this position, the cam completes its rotation, leaving the yoke thus latched in its position for driving the cam wheel 9 at the faster of its two speeds. At any time when it is desired to change again to the slower speed, the control lever is again operated by a tappet 323 on the control disk E, of a height only sufficient to release the catch 331 from the spring plunger 330, thus allowing the clutch yoke to be moved to its slower driving position shown in Fig. 21 by the operation of the spring pressed plunger 326. This tappet need not be high enough to release the detent 314 from the dog 311, which in that case would continue to hold the cam 310 in its stationary position. Or both tappets may be high enough to release the cam 310, the first tappet permitting the arm 322 to fall again in time to catch the plunger 330 and hold the clutch yoke in its fast driving position, the second tappet being extended peripherally far enough to hold the catch 331 clear of the plunger 330 until the cam 310 has rotated far enough to let the catch 331 past the plunger in which case the catch would fail to reach the plunger 330.

Means are also provided for holding the clutch yoke 287 in an intermediate position, as shown in Fig. 23, in which case the clutch mechanism is also held in its intermediate position shown in Fig. 26, the shaft 254, and consequently the cam wheel 9, being free from both driving gears 275 and 277. A stop lever 181, previously referred to, is pivotally mounted on a stud 335, and has an L-shaped extension 336, which engages with a lug or projection 337 of the clutch yoke 287, as shown in Figs. 24 and 25. When out of operation this lever rests in the position shown in Fig. 24, held there by means of the spring 338, the end 339 of the lever stopping against the bed. By moving the lever to the position shown in Fig. 23, in which position it may be retained by the latch 340, the clutch yoke 287 and its associated parts are moved to the intermediate or non-clutching position, shown in Figs. 23 and 26, allowing the cam wheel 9 to stop. The slotting mechanism as previously described in connection therewith, is connected by means of a rod 180 with the stop lever 181, and is stopped whenever the cam wheel 9 is stopped, it being generally undesirable to have the slotting mechanism continue in operation when the turret slide mechanism is out of operation.

For some purposes, especially where considerable variation in the number and frequency of operations of the clutch may be expected, the double acting form of control mechanism shown in Figs. 31 to 36 inclusive, and already fully described, may be found preferable to the single acting form shown in connection with the control disks B and E, its substitution being within the skill of the average mechanic, in the light of the foregoing explanation, using the same shafts and centers. A star wheel and cam like the star wheel 85 and cam 89 of Figs. 31 to 36 inclusive may thus be used in connection with the control lever 322, the control disk E being made of smaller diameter to allow for placing the cam and star wheel between it and the lever. No other change is required at that end of the mechanism.

An arm 321 and connecting rod 320 may be employed to connect the control lever 322 with a modified form of clutch mechanism shown in Figs. 37 to 41 inclusive, in which the detent arm 344 is mounted for swinging movement on the bushing 316; and is provided with two detents 345 upon opposite sides of the center of revolution of the dog 311 around its ratchet wheel 312, and thus stops that revolution and consequently the rotations of the cam 310 at each half rotation. Or, in other words, it permits the cam to be rotated half a turn each time that it is released, the time of release being governed by the position of the tappets 323 around the circumference of the control disk E. When these tappets are placed on diametrically opposite sides of the disk, the half rotations of the cam 310 will begin at equal intervals of time. But either tappet may obviously be adjusted to any desired position to vary the timing, so as to operate the clutch mechanism for driving the cam wheel 9 at either speed, whenever desired, and to any desired extent of its rotation, running at either speed through a greater portion of its rotation, and at the other speed during the less remaining portion of its rotation.

Figs. 37 to 40 inclusive also illustrate a modified form of the pawl mechanism for preventing backward revolution of the dog 311 and similar dogs throughout the machine, when stopped by their respective detents, the cause and effect of which are already described in connection with Figs. 31 to 34. In that case, the backward movement was prevented by means of pawls 82, engaging with notches in the circumference of the cams 72. In this modification, the movable pawl or pawls are carried by the rotating cam or an appurtenant member, and engage with stops, or catches located at suitable stopping positions, the number of pawls being determined by the number of stops to be made at each rotation. In the modification illustrated in Figs. 38, 39 and 40, a flange 346 of, or appurtenant to, the cam 310 is provided with oppositely disposed pawls 347 which are pressed to their outer positions by means of springs 348.

The ends of these pawls engage with a shoulder 349. These pawls, carried by the disk in the direction shown by the arrow in Fig. 40, are forced inwardly against the action of their springs 348 in passing by the shoulder 349 to their stopping positions shown in Fig. 40, which corresponds with the position shown in Fig. 37. The shoulder 349 is herein shown to be attached to the rocking arm 350, but this is merely a matter of convenience, since there is no occasion for the rocking movement of the shoulder 349; and generally it might well be appurtenant to any stationary member of the machine.

The control disk E, in addition to controlling the changes in speed of the cam wheel 9, and through it the corresponding changes in the feed of the tools carried by the turret, also exercises a master control or super-control over the control disks A, B, C, D and E, including itself because it participates in the advancing and retarding movements of the general control. This dual character of the control exercised by the disk E is in this particular machine due to the circumstance that it is so closely associated with the turret tool feed mechanism, in order to control the changes in speed of that mechanism whenever desired, at different portions of its operating period. In machines of this character, the progress of the tools in their cutting operations is generally the best measure of the permissible progress of the entire machine. Moreover, the character and aggregate amount of the work done by the turret tools, as well as the relative amount done by each turret tool, varies greatly with different pieces of work; whereas the other major functions of opening and closing the spindle chuck, feeding forward the stock, changing the speed of the main spindle, indexing the turret, and slotting the work are more nearly uniform, and may, when thus separated and performed by independent mechanisms, be reduced in time to a predetermined minimum. In other words, each of these latter functions may thus be performed at the maximum speed suitable for each, without regard to the time or speed required for the other functions. While thus making these mechanisms independent as to their respective speeds, and consequently their period of operation, it is important to retain a central and general control over their sequence of operation and the time of starting the operation of each. Hence, in this machine, all the major functions referred to, including the turret tool feeding functions, are performed by mechanisms which are independent of each other as to their speed and period of operation, being subject to the central or unitary control only in respect of their time and sequence of starting into operation, by the control disks A, B, C and D, while the control disk E controls the sequence, and time of starting into operation, of the tool feed mechanism at a plurality of different speeds, and also exercises a super-control over all of the disks, including itself, in respect of their progress. This dual function or office of the control disk E, which is herein illustrated as including the tool feed mechanism, in addition to its own control, may be applied to any of the other mechanisms shown instead of the tool feed mechanism. The flexible and adaptable character of this control enables it to be modified and adapted to various conditions and to special requirements.

Any convenient or desired form of cross slides and operating mechanism may be employed for carrying cutting-off or forming tools, acting against the side of the work. In the drawings (Figs. 1 to 5) the present machine is shown to be provided with front and rear cross slides 351, 352, slotted at 353 to receive the desired cutting off or forming tools, and mounted on slideways 354 appurtenant to the bed of the machine. These cross-slides are shown to be worked by means of cam levers 355 and 356 engaging with suitable cam strips attached to the flange or disk 357, keyed to the main shaft 10, or to any suitable shaft, or driven by special or individual driving mechanism, like any of those shown, under the control, if found desirable, of a special control device like one of those shown. The cam levers are clamped or otherwise attached to sector gears or levers 358, meshing with or connected to the cross-slides 351 and 352, respectively.

Means are provided for enabling the tool turret to be unlocked and rotated by hand, which is sometimes desirable in adjusting the machine to new pieces of work. As already described in connection with the locking mechanism, the cross slide 214 is extended through to the front of the turret slide, or is provided with a projecting knob or handle 247 which in this case is shown to extend upwardly through the top of the turret slide to a position where it may be conveniently reached by the hand of the operator, to enable him to withdraw the locking bolt 210. It is also generally necessary to disconnect the turret from the means for rotating it, which in this case includes the worm gear 194 and the worm 195. In Figs. 42, 43 and 44 is shown an arrangement for positively and yet detachably connecting the turret with the driving worm gear 194. The latter is fitted to rotate freely upon the sleeve 192, which is journaled in a bushing 193 carried in a vertical position by the turret slide. The tool turret 5 is mounted upon the turret slide, being provided with suitable bushings 367 and 368 for firmly seating and centralizing the turret, so as to sustain it against the thrust of the work done by the tools, and also generally to enable it to be adjusted for taking up the wear. The upper end of the sleeve 192 is keyed or otherwise firmly secured to the turret. Positive but detachable driving engagement between the worm gear 194 and the sleeve 192 is provided by means of a dog or driver 370, which is fitted into a cross slot or channel extending across the lower face of the sleeve 192 and through the hub or flange of the worm gear 194. When the dog or driver is pressed into the bottom of this cross-slot it serves to lock the worm gear positively to the sleeve 192. The dog is pinned or otherwise secured to the lower end of a rod 371 extending vertically through the sleeve 192 to the top of the turret, being there provided with a projecting knob 372. A spring 373 seated under the knob 272 or any other convenient portion of the rod serves to hold the dog 370 yieldingly into the bottom of its cross-slot, so as to connect the worm gear 194 and the turret sleeve together. But when the knob is pushed down against the pressure of the spring 373 the dog 370 is thereby pushed out of its slot far enough to clear the hub of the gear 194, thus enabling the turret to be turned by hand, whereupon the knob may be released as the dog will then occupy a position out of coincidence with its seat in the worm gear, as indicated by dot-and-dash lines in Fig. 44. Upon turning the turret completely around or otherwise bringing the slots into their former coincidence, the dog is pressed into place by its spring and again locks the turret and worm gear together. It is desirable to have the driving dog 370 extend all the way across, so as to engage with the worm gear at opposite sides of the center of rotation, so as to drive equally upon the two opposite sides. In doing so however, it is important to prevent the dog from dropping into its locking position when the turret has made half a revolution, since this would lock the turret 180 degrees out of its proper operating position. For this reason the dog 370 is made of different widths at its opposite ends, or in some equivalent way adapted to match its driving seat in the worm gear at only one position, instead of two opposite positions.

In some instances it is desirable to employ a rotating drill chuck 376, or other rotating tool holder in the turret. Such an arrangement is shown in Fig. 42, adapted to accommodate the vertical connecting rod 371 for releasing the turret. The drill chuck 376 mounted for rotation in one of the tool holes of the turret is provided on its inner end with a beveled gear 377 meshing with teeth cut on the lower end of a connecting gear sleeve 378 journaled concentrically with the vertical axis of the turret. The upper end of this sleeve is connected by means of bevel gears 379 and 380 with a horizontal shaft 381, which connects by means of gearing or by a pulley and belt with any convenient driving shaft, from which rotary movement is thus communicated to the drill chuck 376 without interfering with the rotation of the turret, or interfering with the free operation of the turret releasing rod 371. That rod is preferably made in two disconnectible sections, connected by a screw thread, the upper section or extension 384 extending through the axial center of the gear sleeve 378, and having upon its upper end the knob 372. A stop collar 385 may be employed to limit the upward movement of the rod. This drilling mechanism may be made removable from the turret by mounting it upon a movable bracket having a flanged foot 386, seated in a corresponding recess in the top of the turret. When the drilling mechanism is not required the bracket may be removed and a cap 387 (Fig. 45) be substituted for it, having a shorter extension rod 388 which is screwed into the operating rod 371 in place of the longer extension 384. This extension rod may be provided with a knob 389, a spring 390 and a collar 391, like the corresponding appurtenances of the extention rod 384, and operating in exactly the same way.

A hand lever 395 (Figs. 1 to 5) is provided to enable the turret slide to be operated by hand when required. The end of that lever is provided with a pivot pin 396 which may be inserted in the appropriate one of a series of pivot seats 397 on the bed or frame, best shown in Figs. 1 and 3. The lever rests upon and bears against the rearward end of the turret slide 4, as shown in Fig. 1.

The mode of operation and function of the respective parts having been already described in connection with their construction, the operation of the machine as a whole may be briefly described as follows:—

A rod of stock 30, of suitable size being gripped in the collet of the spindle 4, the various turret and cross slide tools are selected and adjusted so as to make the required cuts upon the work, and the timing for the operation of each tool is laid out upon the cam wheel 9 and the cam disk 357 by means of cam strips, all of which is well understood by those familiar with the art of "camming" machines of this general character, so as to impart the desired forward and back movements to the turret and the required cross movements to the cross slides. In the case of this machine, however, there is no necessity for taking into account the intervals between the successive operations since that is determined by the control mechanism and not by the cam strips themselves. For example, in the case of a machine having its turret arranged for five tools, if it should be found that the work can be done with four tools, the periphery of the feed cam 9 may be spaced to suit four tools, the unoccupied turret hole being quickly indexed past its operating position by a quickly repeated operation of the indexing mechanism by means of closely succeeding tappets on the control disk D, thereby wasting practically no time and very little of the peripheral surface of the feed cam 9 on account of the tool which is omitted, and enabling the time of the preceding or of the succeeding tool to be extended into the period that would otherwise be taken up by the omitted tool. Or in case no such extension is needed, then the whole time of the complete operation may be correspondingly shortened by advancing the tappets controlling the succeeding operations. Having thus adjusted the cams and their associated mechanism, to suit the individual period of operation, or speed of operation best suited to each function, the sequence and time of starting those operations is next predetermined by adjusting the tappets on the control disks A, B, C, D and E, each succeeding operation being started as soon as the preceding operation will permit. By this arrangement the time of each operation is dependent only upon its own individual needs. Each operation is performed in the shortest time consistent with its needs, and no time is unnecessarily lost between the operations, the latter being moved close up together, as it were, by the adjustment of the tappets on the respective control disks.
Having adjusted the machine and started it off, the various mechanisms are started into operation by the control disks, opening the spindle chuck, feeding the rod of stock forward, and closing the chuck again. The appropriate tools of the turret or cross slides, or both, are next brought into operation at the appropriate times, following each other as closely as is permissible. If the work is to be transferred to the auxiliary slotting or drilling mechanism, the transferring arm 138 is brought forward in front of the screw and moved forward so that the screw will enter and be supported by the collet 137 carried by the arm, while the screw is being severed from the rod, whereupon the arm 138 swings over to the position shown in Fig. 11, and the slotting or drilling operation is performed, after which the piece of finished work is ejected from the collet 137. Meanwhile, as soon as the screw is severed from the rod, the spindle chuck again opens, the rod of stock is advanced to feed forward a new length, the chuck is closed again, the tools begin again, and so on.

The determination of the proper speeds and feeds and the adjustments of the various parts to secure economy, excellence and rapidity of operation, are matters which must necessarily be left to the judgment and skill of operators, and are matters which in relation to the present machine can be determined by their past experience with other automatic screw machines.
The proportion of the driving gearing and other parts and the selection or modification of the various mechanisms are matters within the province of the designer and the builder of machines of this class. For his guidance, however, it seems desirable to call attention to a few considerations which he should take into account.

For many purposes, and particularly in slow moving machines, or for the slower moving parts of the same machine, what may be called the "single acting control mechanism", shown in Figs. 11 and 19 in connection with the control disks B and E, may be found satisfactory and sufficient.
But in the case of a short or quick operation, it may be found difficult to make this single acting form of control lever work quickly enough to disconnect the mechanism controlled by it at the conclusion of a single revolution, on account of the time required for the pin 324 (Fig. 19) to climb over the tappet 323 and drop down again upon the other side, during which time it is possible that the dog 311 may complete its single revolution and pass by the detent 314, before the latter drops far enough to intercept the dog, in which case the dog 311 and its associated mechanism would make a second revolution repeating its former function.
Hence in all cases where the mechanism operates quickly, or the control disk turns slowly, relative to each other, it will generally be found advisable to employ the double acting control devices shown in Figs. 31 to 36 inclusive, in which the dog 74 is not released from one detent until the other detent is moved within the circle of revolution 69 of the dog as illustrated in Fig. 34. In such a case it is not possible for the dog to go farther than is intended.

It is not essential that the detents corresponding to 78 and 79 shall be opposite each other, since they may be disposed at any desired point in the circle of revolution of the dog, so as to impart a short movement at one release and a longer movement at the next release. The mechanism which is driven by these intermittent rotations of the dog may be connected by gearing proportioned so as to increase or reduce the required rotary movements in any desired relation or proportion to the arc of revolution of the dog itself. For example, the half revolutions, which are imparted to the dog 74 are in the arrangement shown herein accompanied by half rotations of the directly connected cam 72. On the other hand, those half rotations may be increased to full revolutions of the cam or other driven member, as in the case of the cams and crank plate on the shaft 104 (Figs. 9 and 10). Or the cam driven by the dog may be double lobed as in the case of the turret unlocking cam 219 (Fig. 18) in which case the cam may perform its complete operation in a half revolution, repeating its complete operation upon the succeeding half revolution at its next release. Or these two lobes may be different, performing one operation at one half revolution and a different operation at the next half revolution.

In general it is recommended to employ the double-acting form of control lever shown in Figs. 31 to 36 inclusive, in which the dog 74 and its appurtenant mechanism is allowed to revolve a partial revolution each time it is released from the bifurcated lever 80. In this way each release of the lever has the same effect, making it immaterial whether the forward end of the lever is moved up or down, thereby avoiding any complications that might be due to the use of odd numbers of operations, resulting from the use of an odd number of holes in the turret, and other possible complications.

Many of the parts which are herein shown as being made separately and joined together may be made integral, and vice versa. For example, the cam levers are generally shown herein to be provided with antifriction rollers, this being the generally accepted practice. Likewise, the detents 78 and 79 of the control lever 80 are shown to be separate pieces inserted in the ends of those arms, this construction being adopted in order to enable these parts to be made from steel and hardened, whereas the arm itself is preferably a casting and made of different metal. Modifications and variations of this character will be well understood by those familiar with this art, and with machine construction in general.

It will be understood that the various terms herein employed to designate the relative positions or directions of movement are herein employed in their relative rather than their absolute sense, and that the various parts may be transposed, inverted, reversed and otherwise modified as to their construction, position, and movement, without departing from the spirit and essence of the present invention.

I claim as my invention:—

1. The combination, in a screw machine, of mechanisms for performing all the major functions of the machine, control devices for starting the said mechanisms independently of each other, and a super-control device for varying the speed of the said control devices.

2. The combination, in a screw machine, of independently operating mechanisms for performing all the major functions of the machine, control devices for determining the time of operation of each of said mechanisms independently of each other, and means for driving the said control devices at various speeds.

3. The combination, in a screw machine, of independently operating mechanisms for performing all the major functions of the machine, control devices for determining the time of each operation independently, and speed changing means for driving the control devices at different speeds, including a super-control device for determining the time of operation of the said speed changing means.

4. In a screw machine, the combination of a tool turret, mechanisms for feeding the stock and indexing the tool turret, and control devices for starting the said mechanisms independently of each other.

5. In a screw machine, the combination of a tool turret, mechanisms for performing the functions of feeding the stock and indexing the tool turret, control devices for starting the said mechanisms independently of each other, and a super-control device for varying the time of operation of the said control devices.

6. In a screw machine, independent mechanisms for feeding the stock and slotting the screws, and control devices for starting the said mechanisms independently of each other.

7. In a screw machine, independent stock feeding and screw slotting mechanisms, control devices for starting the said mechanisms independently of each other, and super-control devices for varying the time of operation of the said control devices.

8. In a screw machine, the combination of a tool turret, independent mechanisms for feeding the stock, indexing the tool turret, and slotting the screws, and control devices for starting the said mechanisms independently of each other.

9. In a screw machine, the combination of a tool turret, independent mechanisms for feeding the stock, indexing the tool turret and slotting the screws, control devices for starting the said mechanisms independently of each other, and super-control devices for varying the time of operation of the said control devices.

10. The combination, in a screw machine, of independent mechanisms for performing the major functions of the machine, and a centralized control therefor, including control devices for the separate mechanisms located closely side by side, and including a super-control for changing the speed of some of the mechanisms.

11. The combination, in a screw machine, of independent mechanisms for performing the major functions of the machine, and a centralized control therefor, including control devices for the separate mechanisms, located closely side by side, and including a super-control for changing the speed of some of the mechanisms, all carried by a single shaft driven by and participating in the changes in speed of the said mechanisms.

12. The combination, in a screw machine, of mechanism for performing a function of the machine, and limited action driving mechanism therefor, including a rotating driver, a dog mounted for revolution with the mechanism to be driven, and disposed adjacent to the rotating driver, means for yieldingly moving the dog into engagement with the driver, a unitary control lever pivotally disposed adjacent to the path of revolution of the dog, and movable into and out of said path, and adjustable control devices driven by the machine, and engaging directly with the lever to swing it into and out of engaging relation to the dog.

13. The combination, in a screw machine, of separate mechanisms for performing the major functions of the machine and limited action driving devices therefor disposed side by side upon a common shaft, each including a rotating driver, a dog mounted upon the mechanism to be driven concentrically with the driver, and yieldingly held into engagement therewith, a series of unitary control levers mounted side by side adjacent to the respective dogs for swinging movement into the respective paths of revolution of the said dogs for disengaging them from their respective drivers, and a series of adjustable control devices for engaging directly with and operating the respective control levers.

14. The combination, in a screw machine, of separate mechanisms for performing all the major functions of the machine, and independent releasing and driving mechanism therefor, including a rotating driver for each mechanism, a dog mounted upon the mechanism to be driven for revolution around the rotating driver, means for yieldingly holding each dog into the path of revolution of its driver, and a bifurcated control lever pivotally mounted in the plane of rotation of each driver, with its bifurcations extending to different portions of the path of revolution of the dog, and centralized adjustable control devices for the said control levers, including a series of disks mounted side by side upon a common driving shaft, and provided with adjustable tappets for engaging with and swinging the respective control levers.

15. In a screw machine, the combination of independent mechanisms for feeding the stock and indexing the tool turret, intermittent driving devices for the said mechanisms, each including a rotating driver, a dog mounted for revolution with the mechanism to be driven, and in engaging relation to the rotating driver, means for yieldingly holding the dog into engagement with the driver, control devices mounted side by side upon a common driving shaft, provided with adjustable tappets, and a series of bifurcated control levers pivotally mounted with one end in engaging relation to the said tappets and with its bifurcated ends extending into the path of rotation of the said dog.

16. In a screw machine, intermittent operating mechanism including in combination an operating cam, a constantly rotating driver, a partial revolution driven member, clutch connections between the said driving and the said driven members, a control device for operating the said clutch mechanism, and connections between the driven member and the said operating cam for converting the said partial revolutions of the driven member into more complete revolutions of the cam.

17. In a screw machine, intermittent operating mechanism, including in combination a single revolution operating cam, a constantly rotating driver, a partial revolution driven member, clutch devices and control devices for imparting the desired partial revolutions from the driver to the driven member, and connecting mechanism for converting the partial revolutions of the driven member into full revolutions of the operating cam.

18. In a screw machine, intermittently operating mechanism including in combination a partial revolution driven member, a constantly rotating driving member therefor, clutch devices, including a control lever having bifurcated arms extending to different portions of the path of the clutch mechanism, and control devices for oscillating the control lever alternately in opposite directions to alternately release and arrest the clutch mechanism at the said different portions of its path of revolution for producing the said partial revolutions of the driven member.

19. The combination, in a screw machine, of mechanism for performing a function of the machine and limited action driving devices therefor, including a rotating multiple toothed driver, a dog appurtenant to the driven mechanism mounted for revolution concentrically with the driver, and yieldingly held into engagement therewith, a unitary control lever having oppositely disposed pawl members movable by oscillations of the lever into and out of the path of revolution of the dog, and control devices driven with the screw machine for oscillating the lever.

20. The combination, in a screw machine, of mechanism for performing a function of the machine, and half revolution driving mechanism therefor including a rotating multiple toothed ratchet wheel, a dog revolving with the driven mechanism concentrically with the said ratchet wheel, and yieldingly held into engagement therewith, an oscillating bifurcated control lever having pawls disposed at diametrically opposite portions of the path of revolution of the dog, and movable into and out of the path by the oscillation of the lever, and control devices driven with the machine for oscillating the lever.

21. The combination, in a screw machine, of intermittent driving mechanism therefor, including in combination a rotating multiple toothed driver, a driven member rotatable concentrically with the driver and provided with a revolving dog yieldingly held into engagement with the driver to clutch the driver and the said member together, a bifurcated control lever provided with a plurality of pawls disposed adjacent to different portions of the path of revolution of said dog, and means for moving the control lever to carry one of said pawls within said path of revolution while moving the other pawl out of said path.

22. The combination, in a screw machine, of intermittent driving mechanism therefor, including a rotating multiple toothed driving member, a driven member rotatable concentrically with the driver and provided with a revolving dog yieldingly held into engagement with the driver to clutch the two members together, a bifurcated control lever provided with a plurality of pawls disposed adjacent to different portions of the path of revolution of said dog, and means for moving the control lever to carry one of its pawls within said path of revolution before moving the other pawl out of said path.

23. The combination, in a screw machine, of intermittent driving mechanism, and control devices therefor, including a control lever, a cam for oscillating said lever, and adjustable control devices for imparting a step by step advance to the cam.

24. The combination, in a screw machine, of intermittent driving mechanism, and control devices therefor, including a control lever, a multiple lobed cam for imparting oscillating movement to the lever, and an adjustable control device for advancing the cam step by step.

25. The combination, in a screw machine, of clutch mechanism, an oscillating lever for controlling the clutch mechanism, a cam having alternate elevations and depressions for oscillating the lever, and adjustable control devices driven with the machine, for advancing the said cam.

26. The combination, in a screw machine, of clutch mechanism, a control lever therefor, a cam provided with alternate elevations and depressions for oscillating the said lever, and adjustable control devices including adjustable tappets driven with the machine for advancing the cam step by step to intermittently oscillate the lever.

27. The combination, in a screw machine, of clutch mechanism, a control lever therefor, a rotatable cam provided with alternate elevations and depressions for engaging with the lever, and means for intermittently advancing the cam, including a star wheel, a rotating control disk adjacent thereto, and a tappet adjustably mounted upon the disk for engaging with the star wheel.

28. The combination, in a screw machine, of clutch mechanism, a control lever therefor, a cam provided with alternate elevations and depressions for oscillating the lever, and means for intermittently advancing the said cam to a position which brings the next actuating portion of the cam in close operating relation to the lever, whereby the lever is operated at the beginning of the next advancing movement of the cam.

29. The combination, in a screw machine, of clutch mechanism, a control lever therefor, a cam provided with alternate elevations and depressions for oscillating the lever and means for intermittently advancing the said cam, including a star wheel operatively connected with the cam, a rotating control disk adjacent thereto, and an adjustable tappet mounted on the disk and engaging with the star wheel, the parts being adjusted to oscillate the lever at the first part of each advancing movement of the cam.

30. The combination, in a screw machine, of a driven part, a plurality of independent driving mechanisms for the said part, clutch devices for connecting either of said driving mechanisms with the said driven part, including a cam for operating the clutch devices, and means for intermittently imparting a partial revolution to the cam, including a rotating driver, a dog mounted to revolve with the clutch devices and yieldingly engaging with the driver, a bifurcated control lever provided with a plurality of pawls disposed in the path of revolution of the dog, and a control device for moving the control lever to carry its pawls alternately into and out of the path of revolution of the dog to govern the time of operation of the cam.

31. The combination, in a screw machine, of a tool carrying turret, mechanism for rotating the turret, mechanism for unlocking and relocking the turret, and intermittently operating clutch devices for driving the said mechanism, including a clutch for the said rotating mechanism, controlled by the movements of the turret unlocking and relocking mechanism, and a control device driven with the machine for governing the movements of the last named clutch.

32. The combination, in a screw machine, of intermittently operating mechanism and control devices therefor including a unitary control lever, a cam for moving the control lever alternately in opposite directions, and adjustable control devices driven by the machine for moving the said cam.

33. The combination, in a screw machine, of clutch mechanism, an oscillating unitary control lever having a plurality of arms for controlling the clutch, at different portions of its rotative path, a cam for oscillating the lever to bring its said arms alternately into operation, and adjustable control devices driven with the machine for moving the said cam.

34. In a screw machine, the combination of a plurality of independent mechanisms for different functions of the machine, clutch devices for the respective driving mechanisms and centralized control mechanism for operating the clutch devices, including a series of control levers mounted side by side, cams for oscillating the said control levers and a corresponding series of control disks mounted side by side and provided with adjustable tappets for moving the said cams.

35. The combination, in a screw machine, of variable speed tool feeding mechanism, including a plurality of clutch devices for connecting the said speed mechanisms to the feed mechanism, a cam, for moving the clutch devices to effect its different connections, and a control device driven with the machine for governing the time of operation of the said cam.

36. The combination, in a screw machine, of variable feed mechanism for the cutting functions, including a plurality of driving devices, clutch mechanism for connecting the different driving devices to the tool mechanism, a cam for moving the clutch device to effect one of its connections, and a catch for holding the said clutch device in its clutching position.

37. The combination, in a screw machine, of variable feed mechanism for the cutting functions, including a plurality of driving devices, clutch mechanism for connecting the different driving devices to the tool mechanism, a cam for moving the clutch device to effect one of its connections, a catch for holding the said clutch device in its clutching position, and means for disengaging the said catch.

38. In a screw machine, the combination of independent driving mechanism for the tool feeding and work slotting functions, of clutch devices for the respective mechanisms, and coöperating connections between the said clutch devices, whereby the screw slotting mechanism is held out of operation when the tool feeding mechanism is out of operation.

39. In a screw machine, the combination of independent mechanism for the tool feeding and work slotting functions, clutch and control devices for driving the said mechanisms independently, and coöperating stop devices between the said clutch mechanisms, whereby the work slotting mechanism is held out of operation when the tool feed mechanism is stopped.

40. In a screw machine, the combination of operating mechanism for performing the tool feeding and work slotting function, independent clutch and control devices for said mechanism, and stop devices for the work slotting mechanism connected with the clutch devices of the tool feeding mechanism, whereby the stopping of the tool feed mechanism also serves to stop the operation of the work slotting mechanism.

In testimony whereof I have signed my name to this specification in the presence of two subscribing witnesses.

BENGT M. W. HANSON.

Witnesses:
 W. M. STORRS,
 H. W. KILBOURNE.